US011532898B2

(12) United States Patent
Wang et al.

(10) Patent No.: US 11,532,898 B2
(45) Date of Patent: Dec. 20, 2022

(54) MULTIBAND MIMO ANTENNA IN A NESTED ARRANGEMENT

(71) Applicant: NetComm Wireless Pty Ltd, Lane Cove (AU)

(72) Inventors: Daniel Wang, Lane Cove (AU);
Michael Cornelius, Lane Cove (AU);
Steven Collins, Lane Cove (AU)

(73) Assignee: NetComm Wireless Pty Ltd, Lane Cove (AU)

( * ) Notice: Subject to any disclaimer, the term of this patent is extended or adjusted under 35 U.S.C. 154(b) by 61 days.

(21) Appl. No.: 17/159,027

(22) Filed: Jan. 26, 2021

(65) Prior Publication Data

US 2021/0175639 A1 Jun. 10, 2021

Related U.S. Application Data

(63) Continuation of application No. PCT/AU2019/050544, filed on May 30, 2019.

(30) Foreign Application Priority Data

Jul. 31, 2018 (AU) .............................. 2018902772

(51) Int. Cl.
*H01Q 21/26* (2006.01)
*H01Q 1/38* (2006.01)
*H01Q 21/00* (2006.01)
*H04B 7/0413* (2017.01)

(52) U.S. Cl.
CPC .............. *H01Q 21/26* (2013.01); *H01Q 1/38* (2013.01); *H01Q 21/0075* (2013.01); *H04B 7/0413* (2013.01)

(58) Field of Classification Search
CPC ...... H01Q 21/26; H01Q 1/38; H01Q 21/0075; H01Q 1/007; H01Q 1/246; H01Q 21/28;

(Continued)

(56) References Cited

U.S. PATENT DOCUMENTS 6,323,820 B1 11/2001 Haunberger
8,199,063 B2 6/2012 Moon et al.
(Continued)

FOREIGN PATENT DOCUMENTS

CN 103036073 A 4/2013
CN 203013940 U 6/2013
(Continued)

OTHER PUBLICATIONS

International Search Report and Written Opinion of the International Searching Authority dated Jul. 18, 2019 in International Patent Application No. PCT/AU2019/050544. 10 pages.
(Continued)

*Primary Examiner* — David E Lotter
(74) *Attorney, Agent, or Firm* — Kilpatrick Townsend & Stockton LLP

(57) ABSTRACT

Multiband multiple input multiple output (MIMO) dual polarised antenna assembly (100) comprising: dual polarised lower band antenna elements (10,20) mounted to ground plane (50) and located proximal to ground plane peripheral sides (50), the location of the lower band antenna elements (10, 20) defining lower band peripheral boundary; dual polarised upper band antenna elements (200, 210) mounted to ground plane (50) and nested within the lower band peripheral boundary; upper feeding network (130) connecting opposing pairs of lower band radiating elements (11, 12, 21, 22) of the dual polarised lower band antenna elements (10,20) and feeds the lower band antenna elements (11, 12, 21, 22), the upper feeding network (130) located within the lower band peripheral boundary; and lower feeding network (140) positioned below upper feeding network (130) and feeds the dual polarised upper band antenna elements (10, 20) via upper feeding network using pair of ultra-wideband duplexers (20A, 20B).

14 Claims, 46 Drawing Sheets

(58) Field of Classification Search
CPC ............ H01Q 5/25; H01Q 5/48; H01Q 15/14; H01Q 19/108; H01Q 21/24; H01Q 9/065; H01Q 21/30; H01Q 9/0407; H01Q 9/0414; H01Q 9/26; H04B 7/0413

See application file for complete search history.

(56) References Cited

U.S. PATENT DOCUMENTS

| | | | |
|---|---|---|---|
| 2005/0225498 A1* | 10/2005 | Koparan | H01Q 9/0414 343/895 |
| 2008/0111757 A1 | 5/2008 | Bisiules et al. | |
| 2014/0145896 A1* | 5/2014 | Bi | H01Q 25/04 343/844 |
| 2016/0204521 A1 | 7/2016 | Chien | |
| 2016/0329642 A1 | 11/2016 | Chainon et al. | |
| 2017/0062940 A1* | 3/2017 | Cao | H01Q 1/246 |

FOREIGN PATENT DOCUMENTS

| | | |
|---|---|---|
| CN | 106848530 A | 6/2017 |
| CN | 206225553 U | 6/2017 |

OTHER PUBLICATIONS

Tao, Jun et al.; "Compact UWB Band-Notch MIMO Antenna with Embedded Antenna Element for Improved Band Notch Filtering"; Progress In Electromagnetics Research C; 2016; vol. 67; pp. 117-125.

International Preliminary Report on Patentability dated Jun. 11, 2020 in International Patent Application No. PCT/AU2019/050544. 25 pages.

Extended European Search Report dated Aug. 30, 2021 in EP Patent Application No. 19844808.6. 9 pages.

* cited by examiner

Radiation Pattern of First Upper Band Antenna Element

Radiation Pattern of First Upper Band Antenna Element

Radiation Pattern of First Upper Band Antenna Element

Radiation Pattern of First Upper Band Antenna Element

Radiation Pattern of First Upper Band Antenna Element

Radiation Pattern of First Upper Band Antenna Element

Radiation Pattern of First Upper Band Antenna Element

Radiation Pattern of Second Upper Band Antenna Element

Radiation Pattern of Second Upper Band Antenna Element

Radiation Pattern of Second Upper Band Antenna Element

Radiation Pattern of Second Upper Band Antenna Element

Radiation Pattern of Second Upper Band Antenna Element

Radiation Pattern of Second Upper Band Antenna Element

Pattern specifications of Lower Band Antenna Element

Pattern specifications of Lower Band Antenna Element

Pattern specifications of Lower Band Antenna Element

Pattern specifications of Lower Band Antenna Element

Pattern specifications of Lower Band Antenna Element

Pattern specifications of Lower Band Antenna Element

Pattern specifications of Lower Band Antenna Element

MULTIBAND MIMO ANTENNA IN A NESTED ARRANGEMENT

CROSS-REFERENCES TO RELATED APPLICATIONS

This application is a continuation application of International Patent Application No. PCT/AU2019/050544 entitled "A MULTIBAND MIMO ANTENNA IN A NESTED ARRANGEMENT," filed on May 30, 2019, which claims priority to Australian Patent Application No. 2018902772, filed on Jul. 31, 2018, all of which are herein incorporated by reference in their entirety for all purposes.

FIELD OF THE INVENTION

The present invention relates to a multiband MIMO antenna in a nested arrangement.

BACKGROUND OF THE INVENTION

For fixed wireless, microcellular systems and small-cell systems, there are various considerations that need to be heeded in product development, including radio frequency (RF) performance of the antenna, form factor (size), weight, cost and simple assembly of the antenna.

A compact and multiple port antenna array for a fixed wireless system is challenging if the size or form factor is constrained, an aesthetically pleasing shape is required, and there is a requirement for RF performance with wideband matching and maximum forward gain.

FIG. 4 of U.S. Pat. No. 6,323,820 shows a traditional multiband antenna with a side by side layout that is combined with a cable structure. FIG. 4 shows a traditional combiner in the form of a cable connecting a lower band radiating element to an upper band radiating element. One problem of this side by side layout of the lower band radiating element and an upper band radiating element is that it causes squinted patterns at the upper frequency band.

FIG. 5 of U.S. Pat. No. 8,199,063 shows a traditional dual band dual polarised base station antenna with more than two upper band antenna elements. In this arrangement of upper band and lower band radiating elements, not every upper band antenna element has the same radiating aperture due to the difference of electromagnetic boundary conditions. Also, the feeding network that connects two co-pol lower band radiating elements uses a traditional cable arrangement. One problem of this antenna is that not every upper band antenna element has the same radiating aperture due to the difference of electromagnetic boundary conditions.

Conventional low frequency band antenna elements are relatively large which makes it difficult to maintain a small overall size for a multiband MIMO antenna that provides additional performance for high frequency band operation.

BRIEF SUMMARY OF THE INVENTION

The inventive concept arises from a recognition that for fixed wireless, cellular base stations and indoor coverage systems, there is a need for a multiband multiple-input-multiple-output (MIMO) miniaturized directional antenna having a low profile and is inexpensive to manufacture. The inventive concept arises from a recognition that high frequency band antenna elements are smaller in size compared to low frequency band antenna elements, and that using a novel arrangement for the antenna assembly enables the addition of additional antenna elements to make a four port design for the high frequency bands without increasing the overall dimensional size or footprint of the antenna array.

It is an object of at least one embodiment of the present invention to provide an antenna assembly having a height that is 58% of the normal height related to the quart-wave of the lowest operating frequency of the antenna assembly.

The present invention, in one aspect, comprises a multiband multiple input multiple output (MIMO) dual polarised antenna assembly arranged in a nested arrangement. The antenna assembly comprises a ground plane. The antenna assembly also comprises dual polarised lower band antenna elements mounted to the ground plane and located proximal to peripheral sides of the ground plane. The location of the lower band antenna elements define a lower band peripheral boundary. The antenna assembly also comprises dual polarised upper band antenna elements mounted to the ground plane and nested within the lower band peripheral boundary. The antenna assembly also comprises an upper feeding network configured to connect opposing pairs of lower band radiating elements of the dual polarised lower band antenna elements and feed the lower band antenna elements, the upper feeding network being located within the lower band peripheral boundary. The antenna assembly also comprises a lower feeding network positioned below the upper feeding network and is configured to feed the dual polarised lower band antenna elements via the upper feeding network using a pair of ultra-wideband duplexers.

A first upper band antenna element of the dual polarised upper band antenna elements may be fed by the lower feeding network using a first ultra-wideband duplexer of the pair of ultra-wideband duplexers.

The opposing pair of lower band radiating elements may be a pair of orthogonal radiating units and each port of the radiating units has two folded dipoles, in parallel configuration.

The folded dipoles may each have partially bent arms that are bent towards the ground plane in order to provide a predetermined isolation between two orthogonal radiating units, and reduce the profile of the antenna assembly.

The antenna assembly may further comprise four shorting pins connecting the partially bent arms with the ground plane.

The upper feeding network may comprise co-planar microstrip lines to connect each of pair of orthogonal radiating units and provide a balanced feed for the lower band antenna elements.

The co-planar microstrip lines may be fed by vertically arranged microstrip lines of the lower feeding network. The vertically arranged microstrip lines may connect to the co-planar microstrip lines at mid-point of their length.

The upper band antenna elements may be identical. Each upper band antenna element may comprise a pair of ultra-wideband dipoles, an ultra-wideband balun and a parasitic director.

The ultra-wideband balun may be configured for ultra-wideband matching and provide balance feeding of the upper band antenna elements.

The pair of ultra-wideband duplexers may be configured to combine or split the upper feeding network, through the vertically arranged microstrip lines, to the lower band antenna elements and the first upper band antenna element. Each ultra-wideband duplexer may comprise a multistage bandpass filter and a multistage band-reject filter to provide ultra wide-band matching, predetermined isolation and low insertion loss.

The multistage band pass filter in multiple half-wave lengths across the ultra-wideband frequency may be predetermined in multiple shorted quarter-wave lengths when the multistage band pass filter is connected to the multistage band reject filter to form a full duplexer configured to suppress any unwanted self-resonance within the lower and upper frequency bands, respectively.

A second upper band antenna element may provide ultra-wideband performance in dual polarisation at an upper band frequency.

The lower and upper band antenna elements, lower and upper feeding networks may be made from aluminium.

The height of the antenna assembly may be about 62 mm.

Other advantages and features of the above and other aspects of invention will become apparent to the skilled addressee upon reading this application and the following description of preferred, non-exhaustive embodiments of the invention provided with reference to the accompanying figures in which like reference numbers denote like elements.

BRIEF DESCRIPTION OF THE DRAWINGS

Embodiments of the invention will be described with respect to the figures, in which like reference numbers denote like elements and in which.

DETAILED DESCRIPTION OF THE INVENTION

Figure 1:
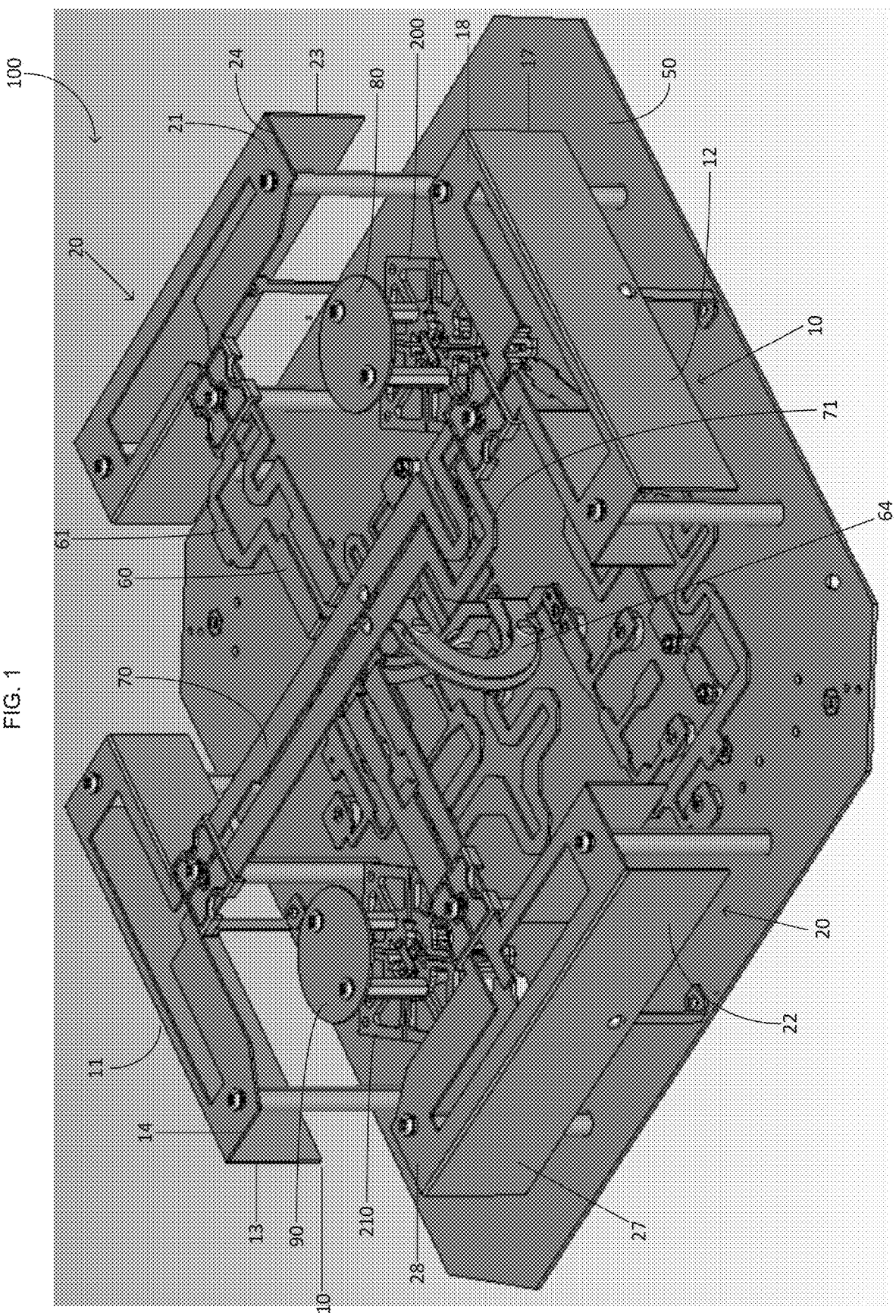
FIGS. 1 to 3 are perspective views from above of the antenna assembly in accordance with a preferred embodiment of the present invention that are rotated clockwise by about 45° for each subsequent view.

A preferred antenna assembly according to the present invention is illustrated in FIG. 1 and shown generally at reference numeral 100.

Figure 2:
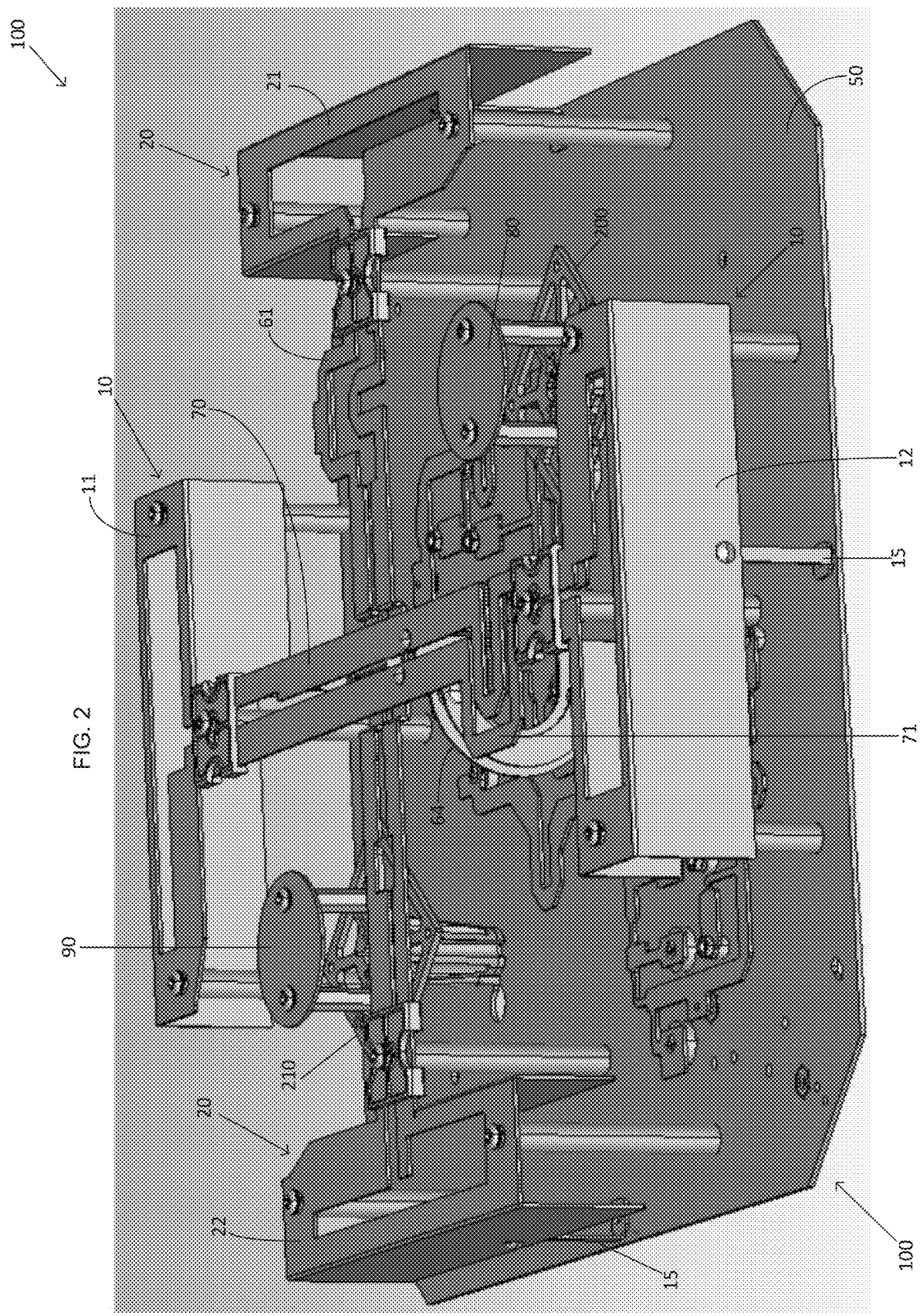
Figure 3:
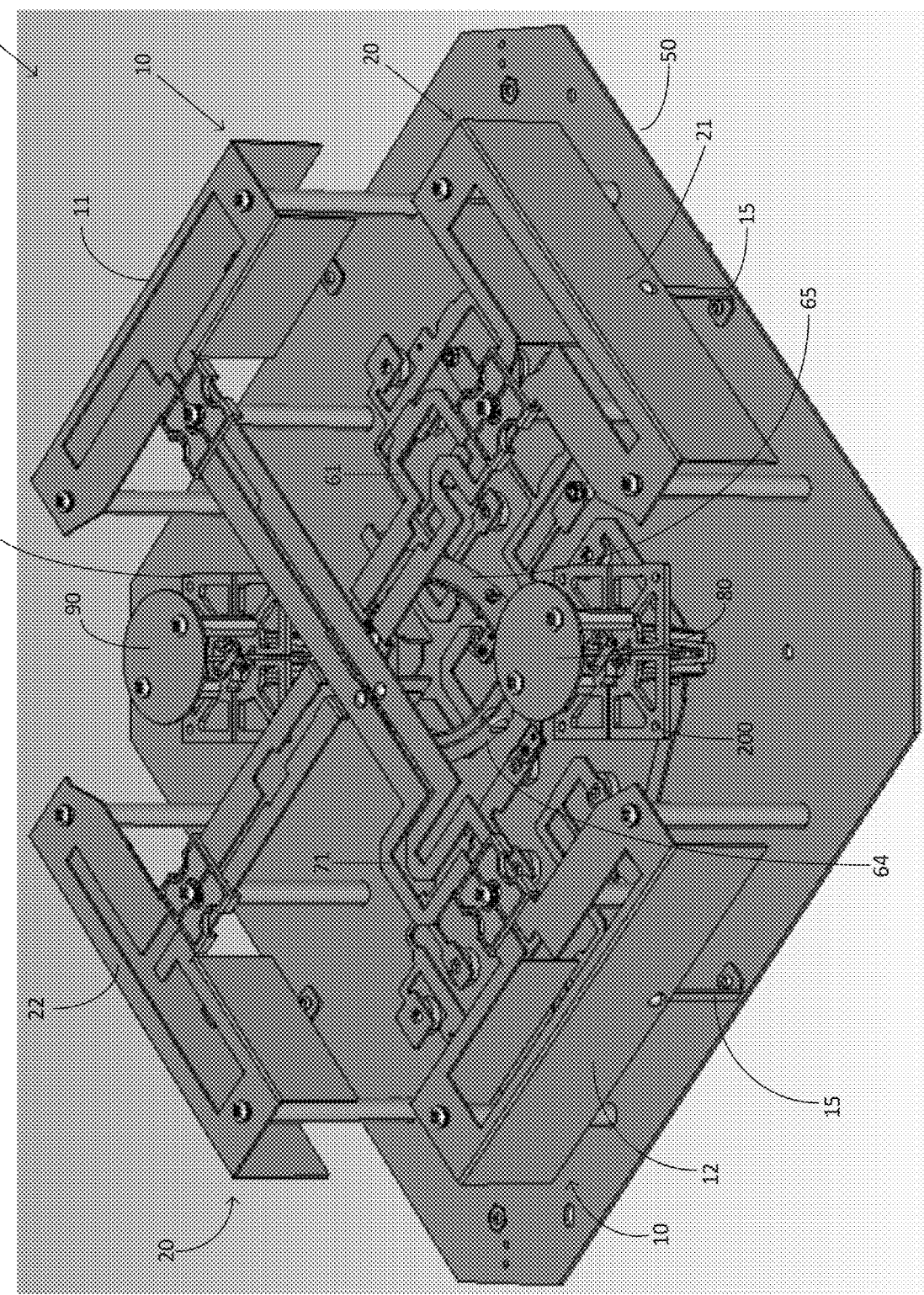
Figure 4:
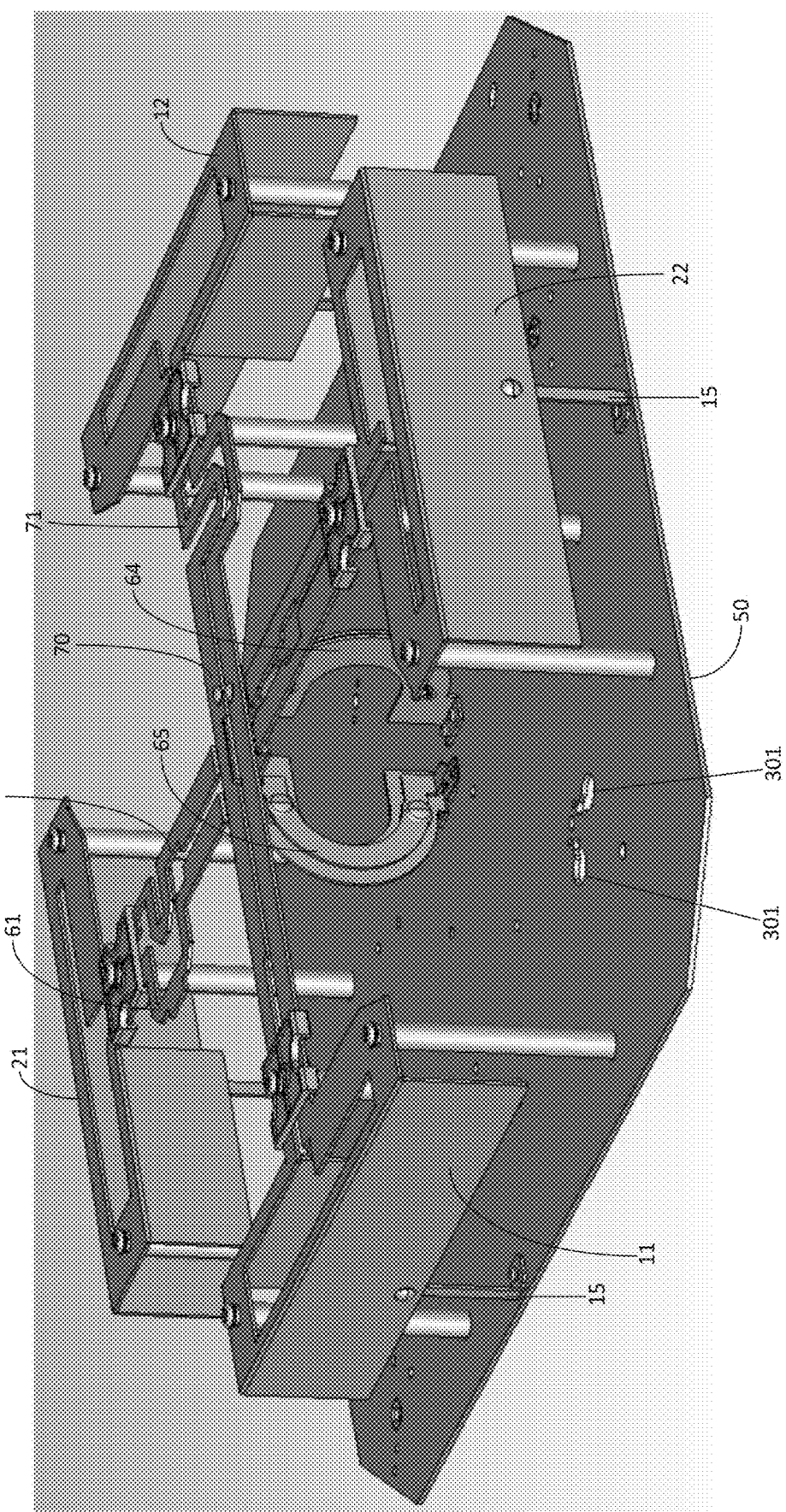
FIG. 4 is a perspective view of a preferred arrangement of dual polarised lower band antenna elements which is a rotated view of FIG. 3 by about 180°, without showing dual polarised upper band antenna elements, and without showing a lower feeding network.

Referring to FIGS. 1 to 3, exemplary embodiments are provided of a multiband and dual polarised directional antenna assembly 100 for a fixed wireless, cellular base station or indoor coverage application. The multiband frequency relates to LTE (Long Term Evolution) frequencies e.g., 4G, 3G, other LTE generation, B17 (LTE), LTE (700 MHz), etc). The antenna assembly 100 comprises a ground plane 50 that has chamfered corners. The antenna assembly 100 also comprises two sets of ultra-wideband feeding network: a lower feeding network 140 (see FIGS. 14 and 21) and an upper feeding network 130 (see FIG. 5). The antenna assembly 100 also comprises dual polarised upper band antenna elements 200, 210 disposed diagonally opposite each other on the ground plane 50. The antenna assembly 100 also comprises dual polarised lower band antenna elements 10, 20. The lower band antenna elements 10, 20 are mounted at an elevated height onto the ground plane 50 by vertical plastic posts. The upper band antenna elements 200, 210 are nested within the lower band antenna elements 10, 20. In other words, the upper band antenna elements 200, 210 are located between the lower band antenna elements 10, 20 on the ground plane 50.

A first lower band antenna element 10 comprises a first pair of lower band radiating elements 11, 12 disposed on opposite sides of the ground plane 50. The first pair of lower band radiating elements 11, 12 of the first lower band antenna element 10 may be referred to as the first lower band radiating element 11 and the second lower band radiating element 12. A second lower band antenna element 20 comprises a second pair of lower band radiating elements 21, 22 disposed on opposite sides of the ground plane 50 orthogonal to the first pair of lower band radiating elements 11, 12. The second pair of lower band radiating elements 21, 22 of the second lower band antenna element 20 may be referred to as the third lower band radiating element 21 and fourth lower band radiating element 22.

Figure 14:
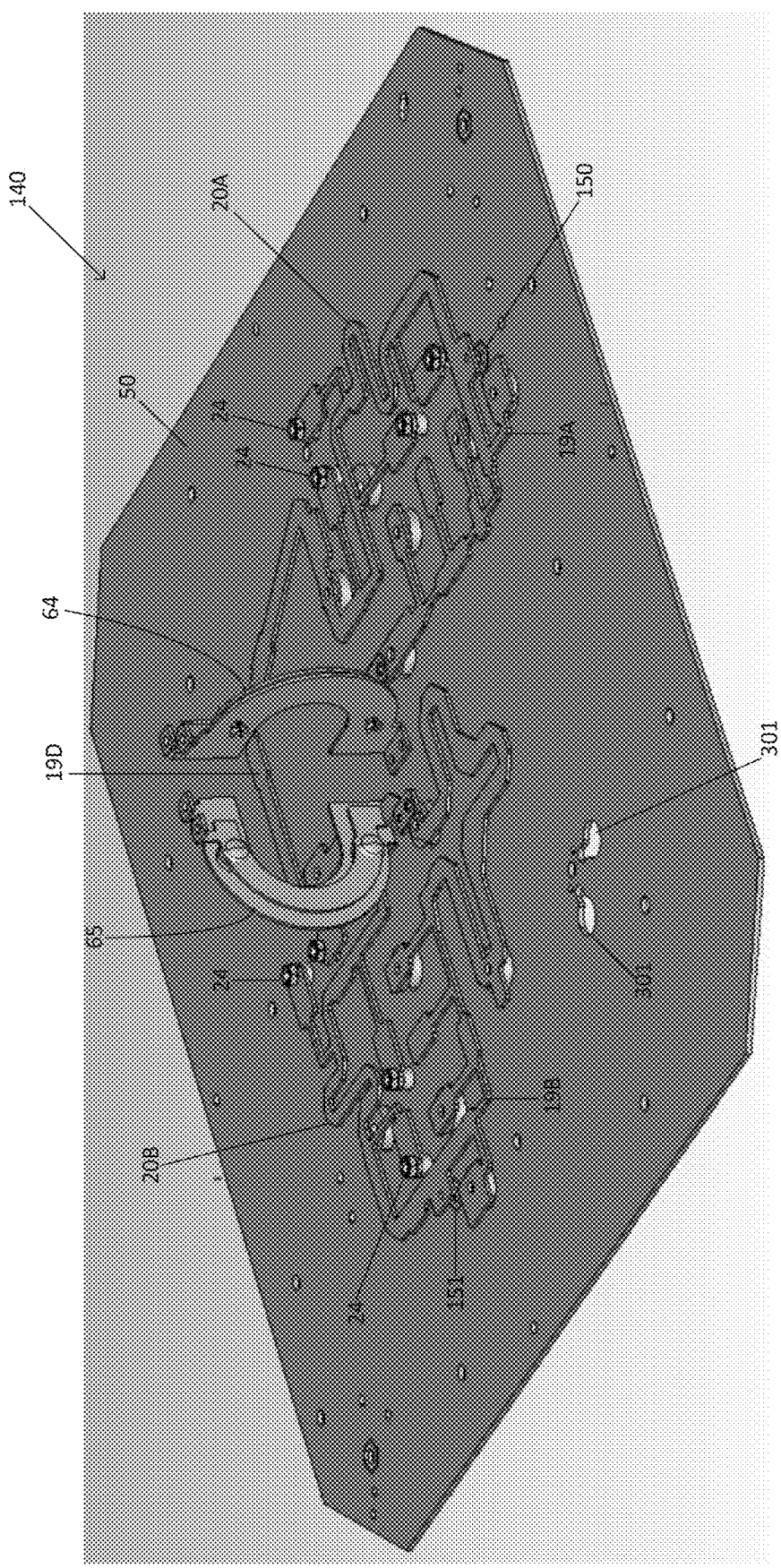
FIG. 14 is a perspective view of FIG. 8 depicting the lower feeding network configured to the two vertically arranged microstrip lines, without showing the upper band antenna elements and the lower band antenna elements.

The first upper band antenna element 200 is located proximal to the second lower band radiating element 12 and the third lower band radiating element 21. The second upper band antenna element 210 is located proximal to the first lower band radiating element 11 and the fourth lower band radiating element 22. The nested configuration is provided by a novel arrangement of the lower band antenna elements 10, 20, the feeding networks 130, 140, the upper band antenna elements 200, 210 and a set of ultra-wideband duplexers 20A, 20B (as best seen in FIG. 14).

Figure 7:
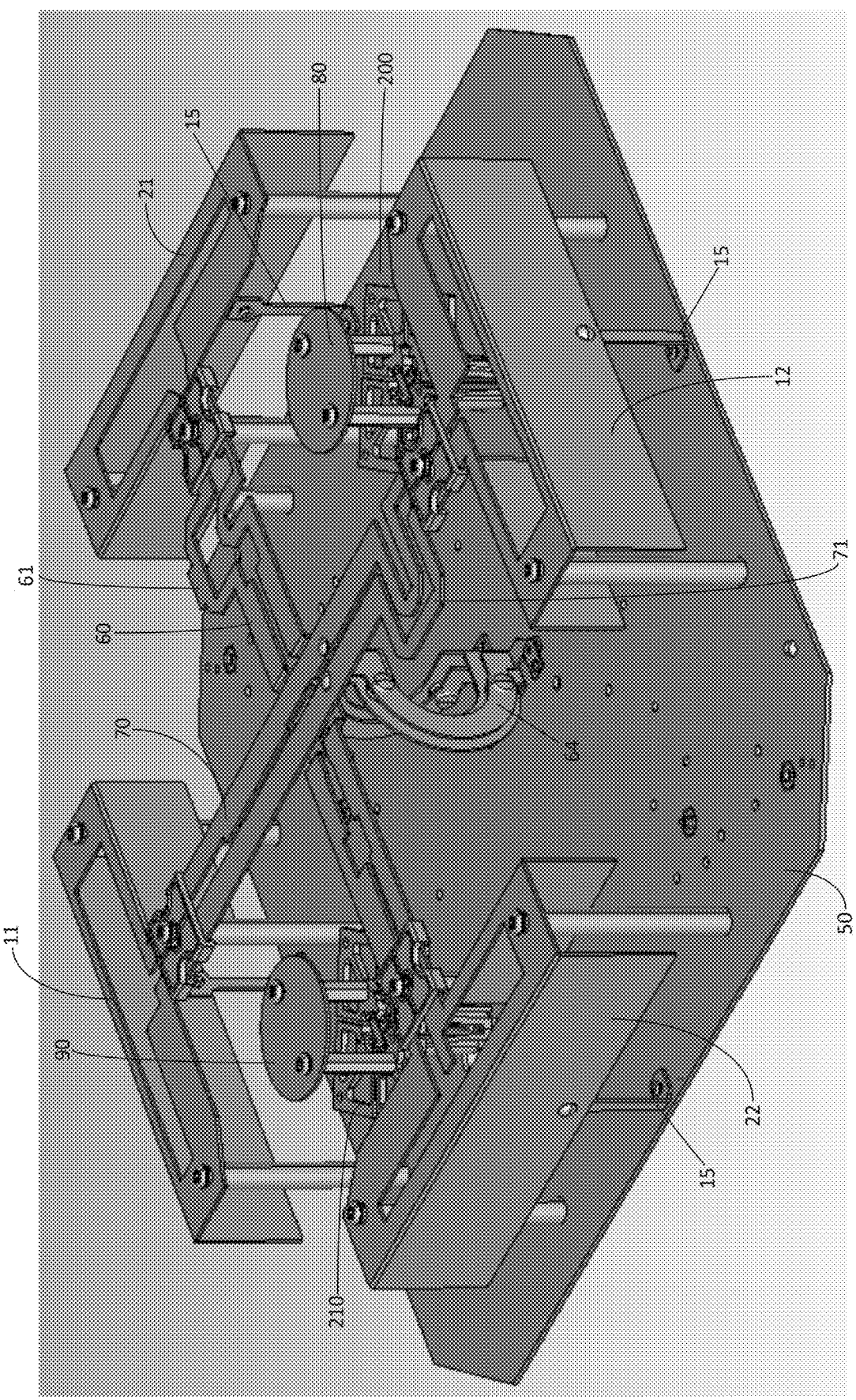
FIG. 7 is a perspective view of FIG. 1 without showing the lower feeding network.
Figure 12:
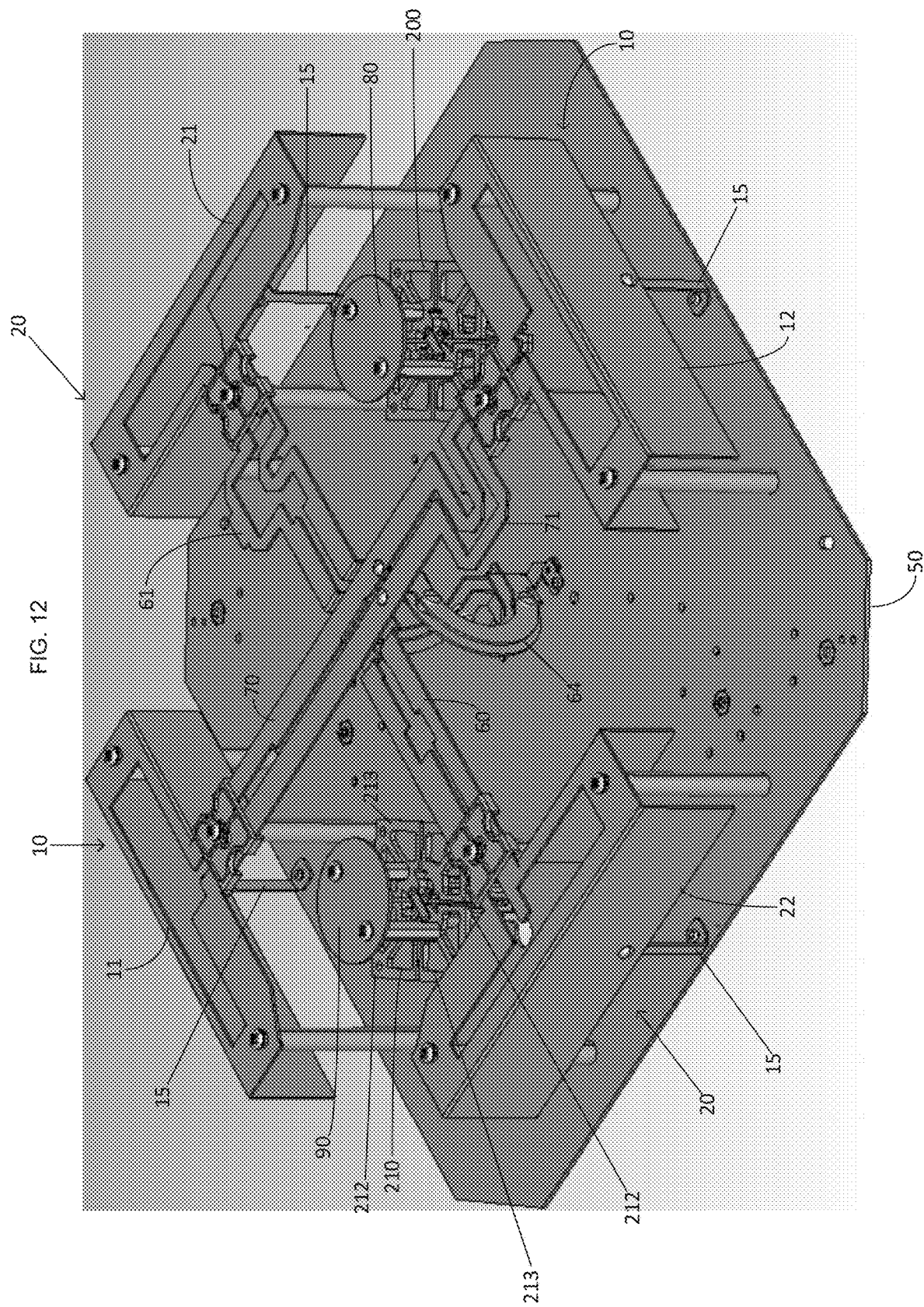
FIG. 12 is a perspective view of FIGS. 1 and 7 showing the two upper band antenna elements nested within the two lower band antenna elements, without showing the lower feeding network.

The antenna assembly 100 is depicted in substantially the same first orientation in FIGS. 1, 7, 12 where the first upper band antenna element 200 appears at the right in this view.

The antenna assembly 100 is depicted in substantially the same second orientation in FIGS. 4 to 6, 8, 10, 11, and 14 to 25, which is about a 90° anticlockwise rotation of the ground plane 50 from the view in the first orientation, where the first upper band antenna element 200 appears at the top in this view.

Upper Band Antenna Elements

Figure 13:
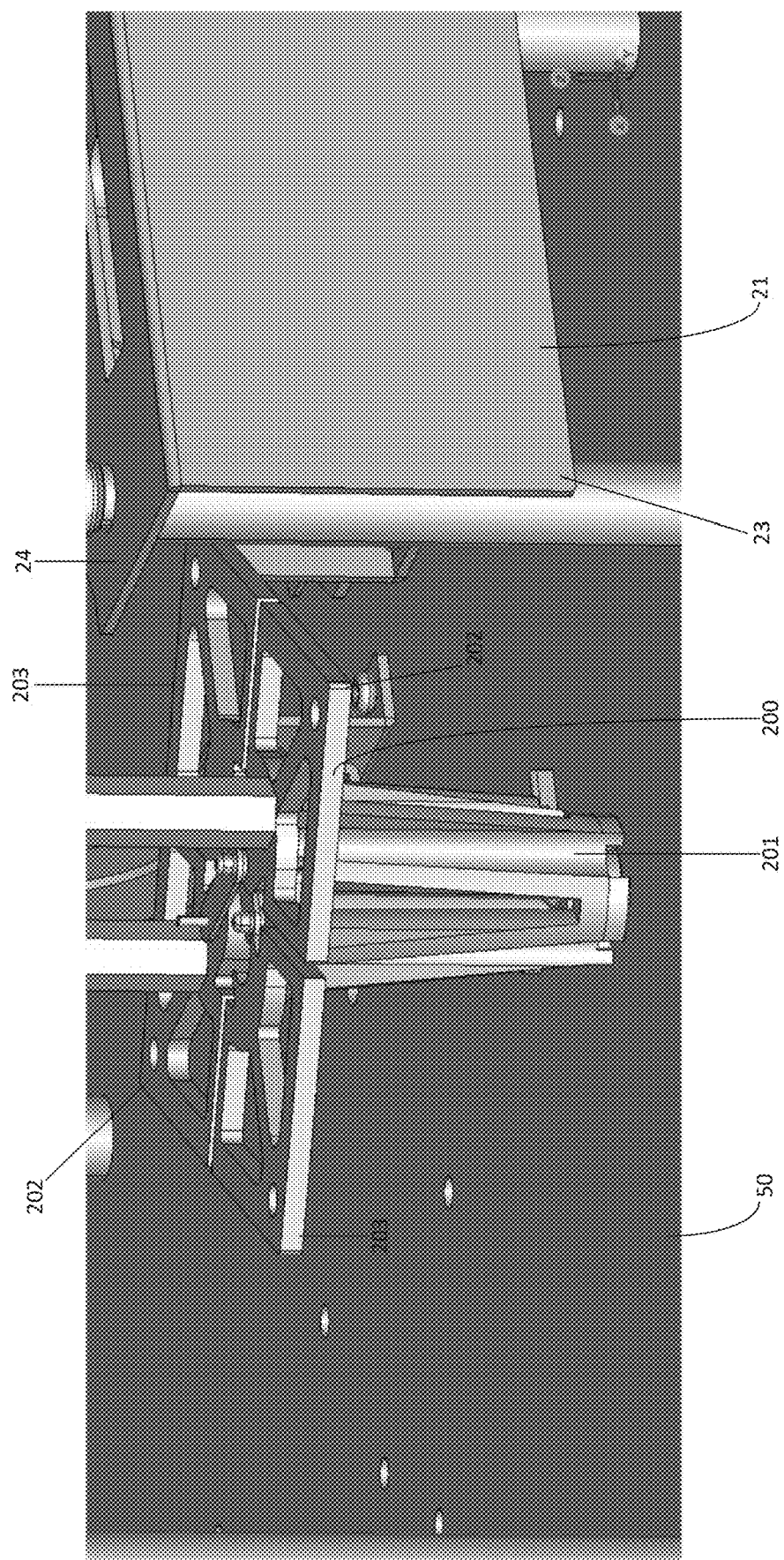
FIG. 13 is a magnified perspective view of a balun of an upper band antenna element.
Figure 20:
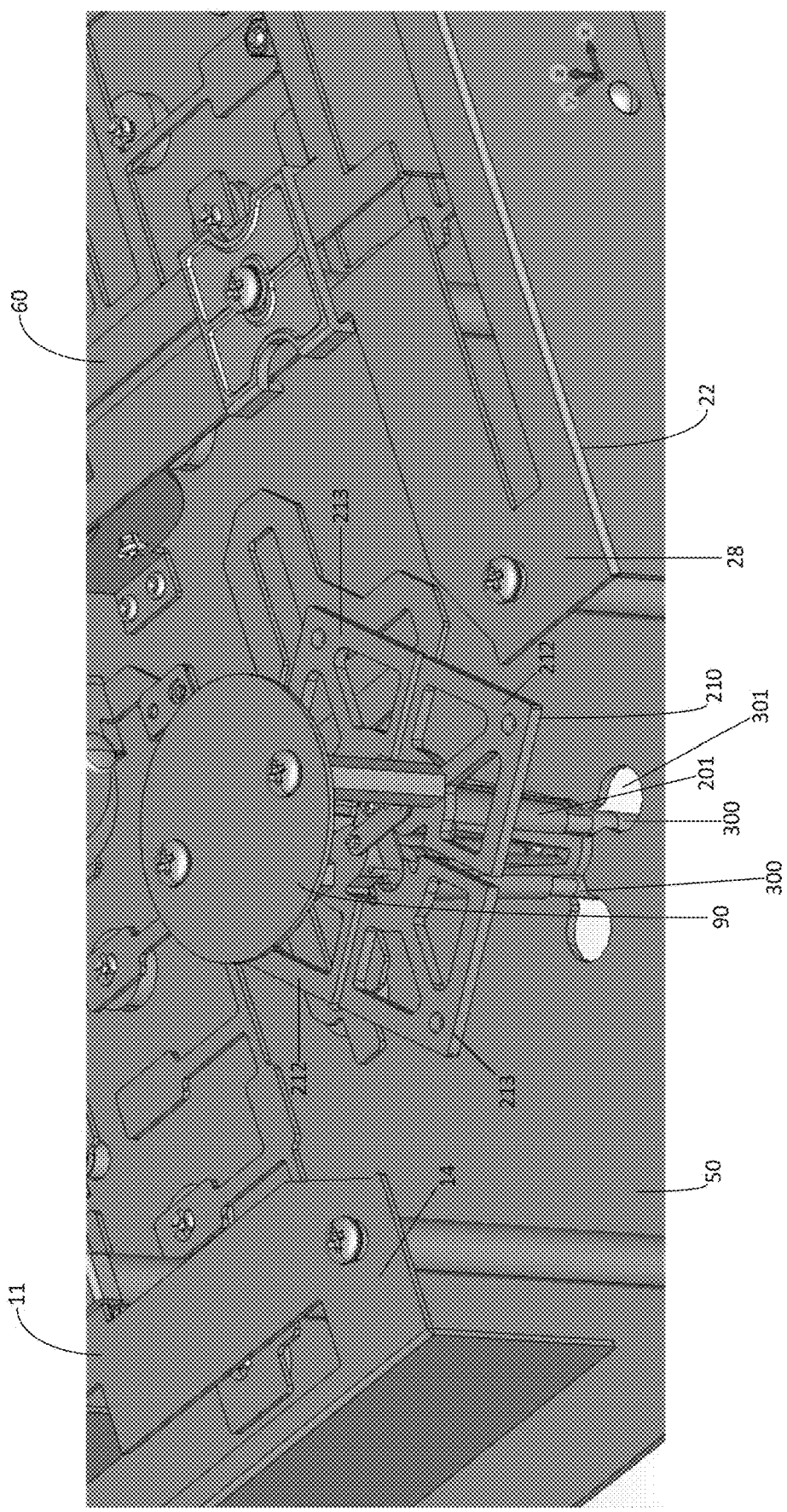
FIG. 20 is a magnified perspective view of FIG. 8 depicting an upper band antenna element nested within the lower band antenna elements and its relative position to the upper feeding network.

Turning to FIGS. 13 and 20, each upper band antenna element 200, 210 is preferably a wideband dual polarised antenna element disclosed in Australian provisional patent application 2018900850 filed on 15 Mar. 2018 herein incorporated by reference in its entirety. Each upper band antenna element 200, 210 comprises two orthogonal ultra-wideband dipoles 202, 203, 212, 213.

The first upper band antenna element 200 includes a first pair of orthogonal upper band radiating units 202 and a second pair of orthogonal upper band radiating units 203. The two pairs of orthogonal upper band radiating units 202, 203 are oriented such that the first ultra-wideband dipole 202 provides +45° polarization and the second ultra-wideband dipole 203 provides −45° polarization.

The second upper band antenna element 210 includes a third pair of orthogonal upper band radiating units 212 and a fourth pair of orthogonal upper band radiating units 213. The two pairs of orthogonal upper band radiating units 212, 213 are oriented such that the third ultra-wideband dipole 212 provides +45° polarization and the fourth ultra-wideband dipole 213 provides −45° polarization.

Alternatively, the orthogonal upper band radiating units 202, 203, 212, 213 may be oriented such that the first and third ultra-wideband dipoles 202, 212 provides vertical polarization and the second and fourth ultra-wideband dipole 203, 213 provides horizontal polarization.

The first upper band antenna element 200 has two ultra-wideband baluns 201 configured to provide balance feeding of the first upper band antenna element 200. The second upper band antenna element 210 also has two ultra-wideband baluns 201 configured to provide balance feeding of the second upper band antenna element 210. The first upper band antenna element 200 is connected to the set of duplexers 20A, 20B provided in the lower feeding network 140 via the ends 19 C and 19D of the lower feeding network 140, as may be best seen in FIGS. 22 and 23, but also by comparing FIGS. 3, 13, 15 and 19. In contrast, the second upper band antenna element 210 is directly connected to an exit cable as explained in more detail below; see FIGS. 2, 8, 16 and 20 in particular. The baluns 201 provide a balanced feed. The baluns 201 may be generally cylindrically-shaped or tubular, and extend in a substantially vertical direction from the radiating units to a base of the antenna element proximal to a central axis of the upper band antenna elements 200, 210. A first portion of a first balun is tubular and forms a cable outer to surround a first inner feed line to achieve matching impedance (1) of the first inner feed line. Each upper band antenna element 200, 210 also comprises a second balun for the −45° polarised antenna dipole. A first portion of the second balun is tubular and forms a cable outer to surround a second inner feed line to achieve matching impedance (1) of the second inner feed line. The baluns 201 of each upper band antenna element 200, 210 are connected together at their base region, see FIGS. 13, 16 and 20.

A parasitic director or parasitic element 80, 90 is mounted to and positioned above the ultra-wideband dipole 202, 203, 212, 213 for each upper band antenna element 200, 210. The parasitic elements 80, 90 are configured to deliver focused forward gain through the electromagnetic boundary condition (the radiating aperture arranged by the lower band antenna elements 10, 20), specifically two orthogonal co-planar microstrip lines 60, 70 connected to four folded/orthogonal ultra-wideband dipoles 11, 12, 21, 22 of the lower band antenna elements 10, 20. The parasitic element 80, 90 generally has a circular shape with a diameter less than the width of an upper band antenna element 200, 210.

Figure 16:
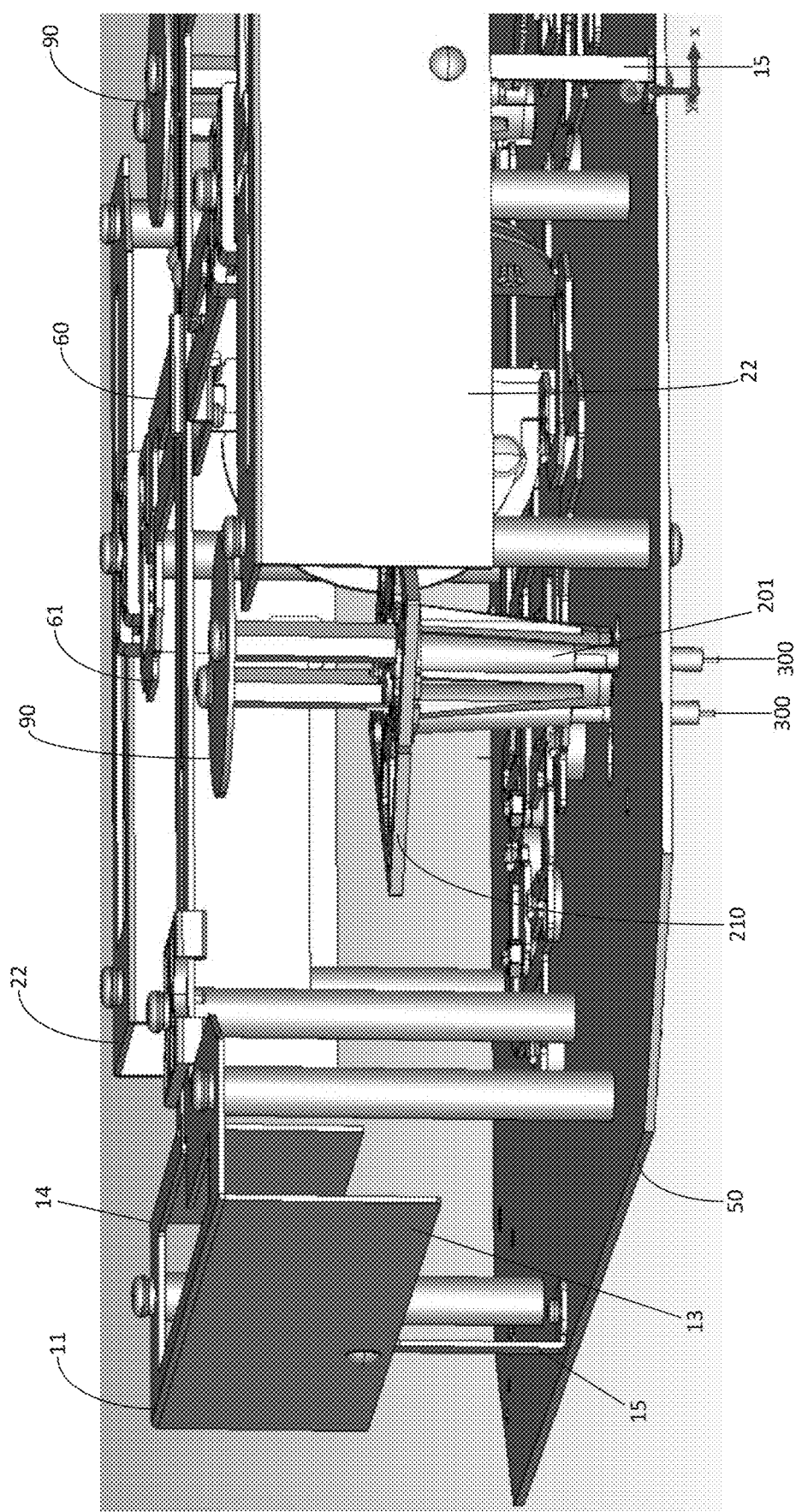
FIG. 16 is a perspective side view of the second upper band antenna element nested within a lower band antenna element.

Referring to FIGS. 16 and 20, the second (free standing) upper band antenna element 210 provides an additional port for MIMO functionality which improves the performance of the link. The second upper band antenna element 210 is not connected to the duplexer or upper feeding network 130.

There are four physical ports (exit cables) of the directional antenna assembly 100 that extend under the ground plane 50 via output port holes 301. There are four radio frequency (RF) ports for the upper frequency band of 1710 MHz to 2700 MHz and there are two radio frequency (RF) ports for the lower frequency band of 698 MHz to 960 MHz in order to provide MIMO performance. The actual output ports are two ports at 698 MHz to 960 MHz and 1710 MHz to 2700 MHz through the duplexer, and two ports at 1710 MHz to 2700 MHz. The first upper band antenna element 200 is connected to the other end of the duplexer 20A, 20B at terminal ends 19C and 19D of lower feeding network 140, see FIGS. 22 and 23. The second upper band antenna element 210 is directly fed by two cables 300 that pass through the two ultra-wideband baluns 201 of the second upper band antenna element 210.

The upper band antenna elements 200, 210 are positioned closer to the lower band antenna elements 10, 20 rather than the centre of the ground plane 50. The lower band antenna elements 10, 20 and the orthogonal co-planar microstrip lines 60, 70 joining the lower band antenna elements 10, 20 together form a corresponding radiating aperture around each of the upper band antenna elements 200, 210. By locating each upper band antenna element 200, 210 in the centre of each radiating aperture, the forward gain of each upper band antenna element 200, 210 is increased by about 1 dB because an optimised antenna pattern is created. The increased forward gain is an additional benefit of the nested arrangement of the upper band antenna elements 200, 210 and lower band antenna elements 10, 20.

Lower Band Antenna Elements

Referring to FIGS. 1 to 12, each of the four lower band radiating elements 11, 12, 21, 22 of the two lower band antenna elements 10, 20 is a parallel folded dipole. The folded dipoles 11, 12, 21, 22 are arranged in parallel configuration. There is a pair-wise relationship between the folded dipoles 11, 12, 21, 22 where folded dipoles 11, 12, 21, 22 disposed opposite each other on the ground plane 50 are considered a pair. The folded dipole is also a port of the lower band antenna element 10, 20. Each port of the lower antenna element 10, 20 provides two folded dipoles, in parallel configuration. A first pair of folded dipoles 11, 12 is connected to each other by a first co-planar microstrip line 60. A second pair of folded dipoles 21, 22 is connected to each other by a second co-planar microstrip line 70. The first pair of folded dipoles 11, 12 is connected to an associated wideband matching network, namely, the horizontally arranged microstrip line 19B via a first vertically arranged microstrip line 64. The first vertically arranged microstrip line 64 are a pair of C-shaped members held at fixed positions from each other. The second pair of folded dipoles 21, 22 is connected to an associated wideband matching network, namely, the horizontally arranged microstrip line 19A via a second vertically arranged microstrip line 65. The second vertically arranged microstrip line 65 are a pair of C-shaped members held at fixed positions from each other.

Preferably, all four folded dipoles 11, 12, 21, 22 have partially bent arms that are bent in a direction towards the ground plane 50 to achieve the good predetermined isolation between the folded dispoles/orthogonal radiating units 11, 12, 21, 22. The folded dipoles 11, 12, 21, 22 have an extremely low profile. In a preferred embodiment, the height is 62 mm. The arms are bent relative to each other where horizontal arm members 14, 18, 24, 28 are oriented to outer vertical arm members 13, 17, 23, 27 respectively at about 90. Each outer vertical arm members 13, 17, 23, 27 (see FIG. 1) of the folded dipole 11, 12, 21, 22 is shorted onto the ground plane 50 through a shorting pin 15 (see FIGS. 2, 3, 11 and 24). The shorting pin 15 is located between, at about the middle, of the outer four vertical arm members 13, 17, 23, 27 and the ground plane 50. The upper arms 14, 18, 24, 28 have a centrally located slot which defines the physical shape of the folded dipoles 11, 12, 21, 22.

Two of the folded dipoles 12, 22 have an additional inner vertical arm member extending from the horizontal arm member 18, 28 in order to improve the isolation between two polarizations while keeping the size of the folded dipoles 12, 22 physically compact.

The four orthogonal radiating units 11, 12, 21, 22 can be oriented such that two opposing folded dipoles 11, 12 in parallel configuration provides +45° polarization and the other two opposing folded dipoles 21, 22 in parallel configuration provides −45° polarization. Alternatively, the four orthogonal radiating units 11, 12, 21, 22 can be oriented such that two opposing folded dipoles 11, 12 in parallel configuration provide vertical polarization and the other two opposing folded dipoles 21, 22 in parallel configuration provide horizontal polarization.

The corners of the horizontal arm members 18, 24 of the folded dipoles 12, 21 proximal to the first upper band antenna element 200 are chamfered in order to reduce the interference onto the first upper band antenna element 200. Similarly, the corners of the horizontal arm members 14, 28 of the folded dipoles 11, 22 proximal to the second upper band antenna element 210 are chamfered in order to reduce the interference with the second upper band antenna element 210. The improved radiation patterns of the upper band antenna elements 200, 210 at various frequencies are depicted in FIGS. 26 to 39 and the lower band antenna elements 10, 20 at various frequencies are depicted in FIGS. 40 to 46.

The disclosed arrangement of the lower band antenna elements 10, 20 delivers ultra-wideband matching and good predetermined isolation between their orthogonal radiating units 11, 12, 21, 22 at a low frequency band, and also provides an optimized electromagnetic boundary condition for the nested upper band antenna elements 200, 210.

Feeding Networks

The antenna assembly 100 comprises two sets of ultra-wideband feeding network 130, 140. The ultra-wideband feeding networks 130, 140 are an arrangement consisting of a lower feeding network 140 of horizontally arranged microstrip lines 19A, 19B, an upper feeding network 130 of co-planar microstrip lines 60, 70 and vertically arranged microstrip lines 64, 65 connecting these. The feeding networks 130, 140 connect one of the upper band antenna elements 200, 210, namely the first antenna element 200, to the set of ultra-wideband duplexers 20A, 20B, see FIGS. 2, 15, 16, 20 and 23.

By having two sets of feeding network 130, 140, the antenna assembly 100 is able to operate at low and high frequency bands at the same time. The lower feeding network 140 provided by the duplexer 20A, 20B operates at the frequency bands of 698 MHz to 960 MHz (low frequency band) and 1710 MHz to 2700 MHz (high frequency band). Alternatively, the same arrangement for the antenna assembly 100 can operate at the frequency band of 138 MHz to 174 MHz, or 380 MHz to 520 MHz at the lower frequency band, and can operate at the frequency at 3.5 GHz, 5.8 GHz, 28 GHz and the 5G frequency band at the upper frequency band.

Lower Feeding Network

Figure 21:
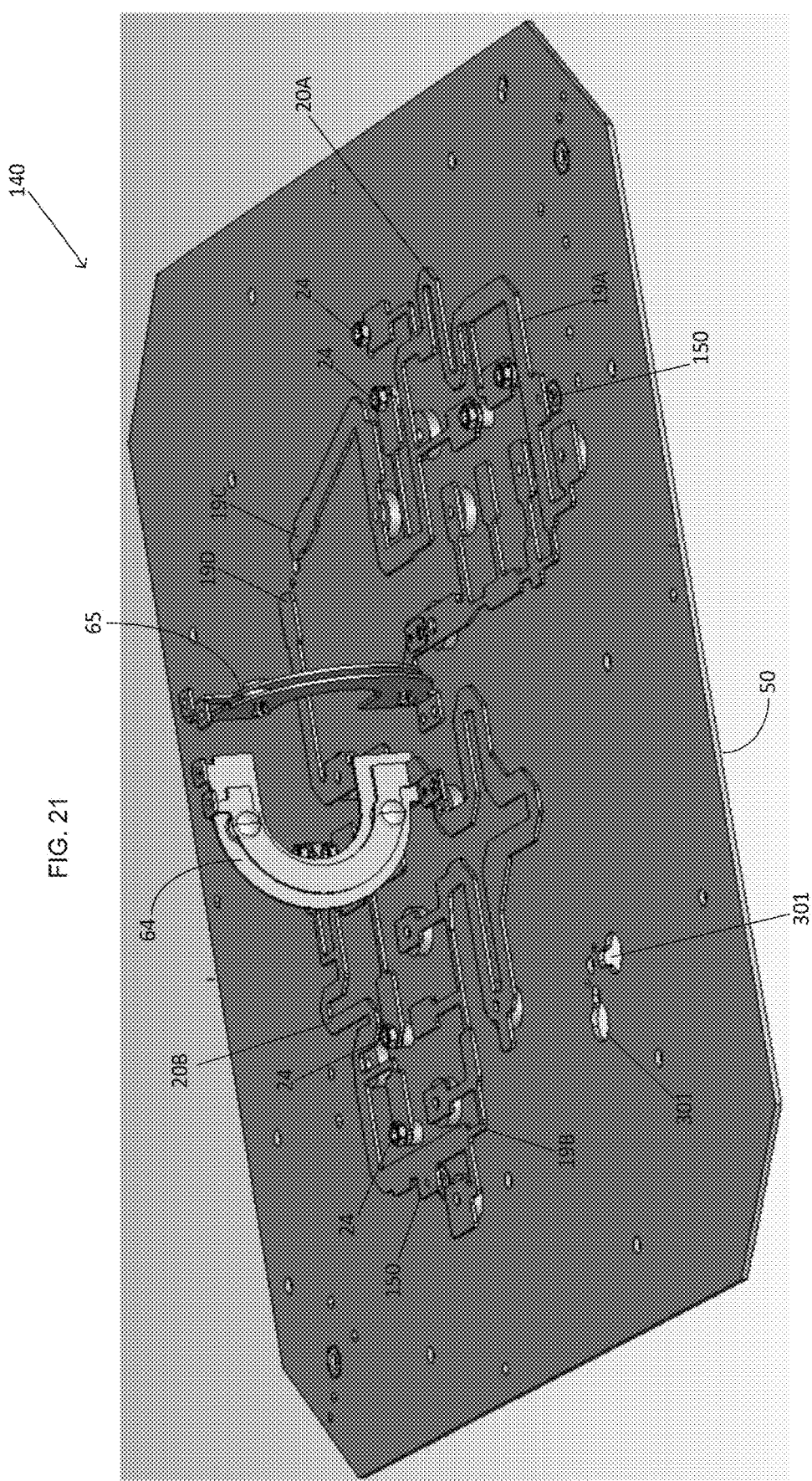
FIG. 21 is perspective view that is slightly rotated clockwise from the view of FIG. 14 depicting the vertically arranged microstrip lines and horizontally arranged microstrip lines of the lower feeding network.

Referring to FIGS. 14 and 21, the lower feeding network 140 is a feed matching network configured to feed the lower band antenna elements 10, 20, through the upper feeding network 130, and the first upper band antenna element 200 using a pair of ultra-wideband duplexers 20A, 20B formed in the lower feeding network 140. The lower feeding network 140 is provided in the form of horizontally arranged microstrip lines 19A, 19B that are positioned closely above the ground plane 50. Air is used as the dielectric. The structural path or routing of the lower feeding network 140 over the ground plane 50 is designed such that the lower feeding network 140 fits within the nested arrangement of the upper band antenna elements 200, 210 and the lower band antenna elements 10, 20. The horizontally arranged microstrip lines 19A, 19B are configured to connect the lower band radiating element 10, 20 and the set of ultra-wideband duplexers 20A, 20B together.

Figure 15:
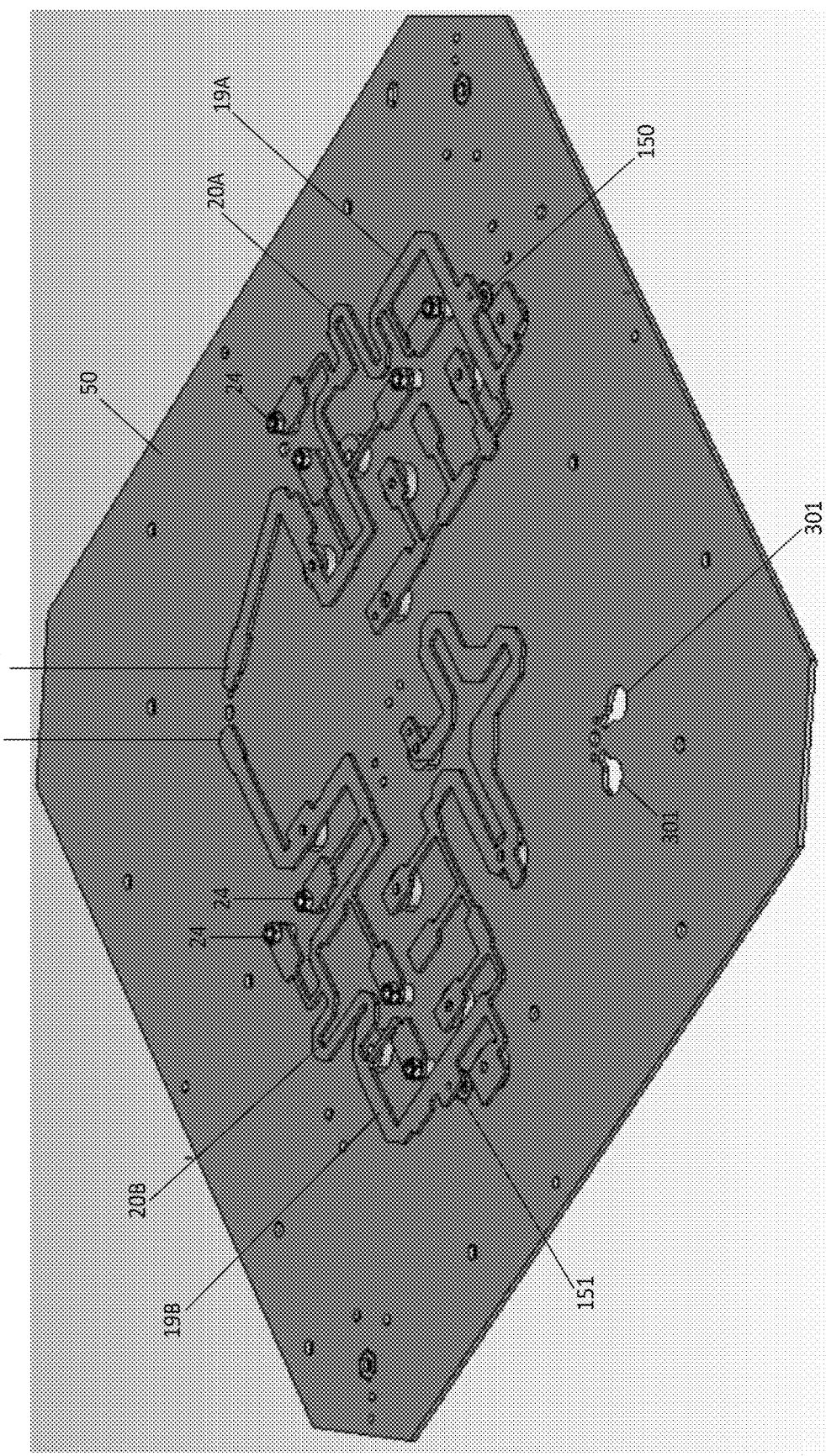
FIG. 15 is a perspective view of FIG. 14 depicting an ultra-wideband duplexer set of the lower feeding network, without showing the two vertically arranged microstrip lines.
Figure 18:
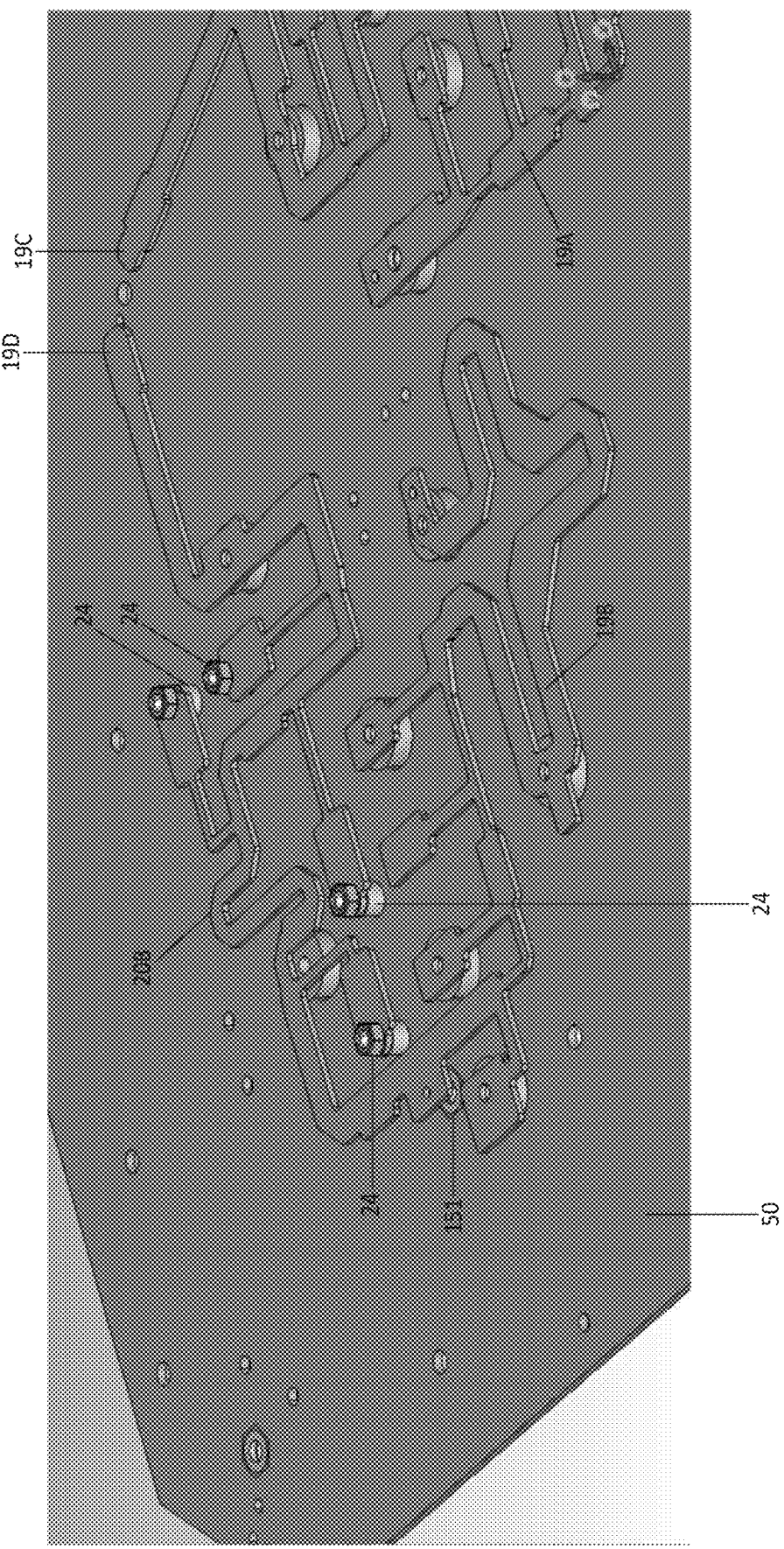
FIG. 18 is a magnified perspective of FIG. 15 depicting a second duplexer of the duplexer set of FIG. 15.

Referring to FIGS. 14, 15 and 18, the lower feeding network 140 has two outputs 150, 151 for the wideband frequencies of 698 MHz to 960 MHz and 1710 MHz to 2700 MHz. The two ultra-wideband duplexers 20A, 20B are provided to deliver wideband lower band impedance matching and ultra-wideband upper band impedance matching with low insertion loss through the arrangement and routing path of the horizontally arranged microstrip lines 19A, 19B. The lower feeding network 140 is configured to deliver ultra-wideband performance in dual polarisation at both the lower band and upper band frequencies.

Figure 22:
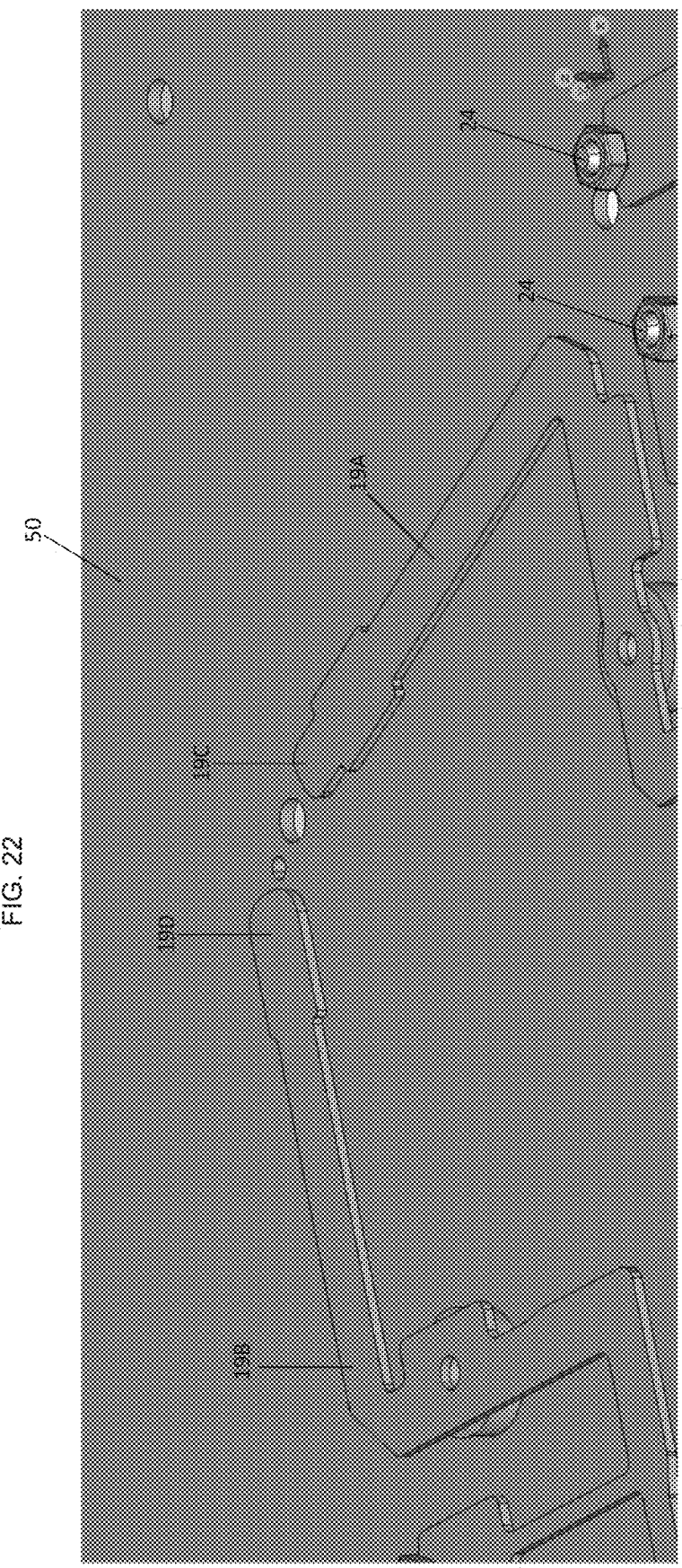
FIG. 22 is a magnified partial perspective view of FIG. 17 depicting ends of the horizontally arranged microstrip lines of the lower feeding network.
Figure 23:
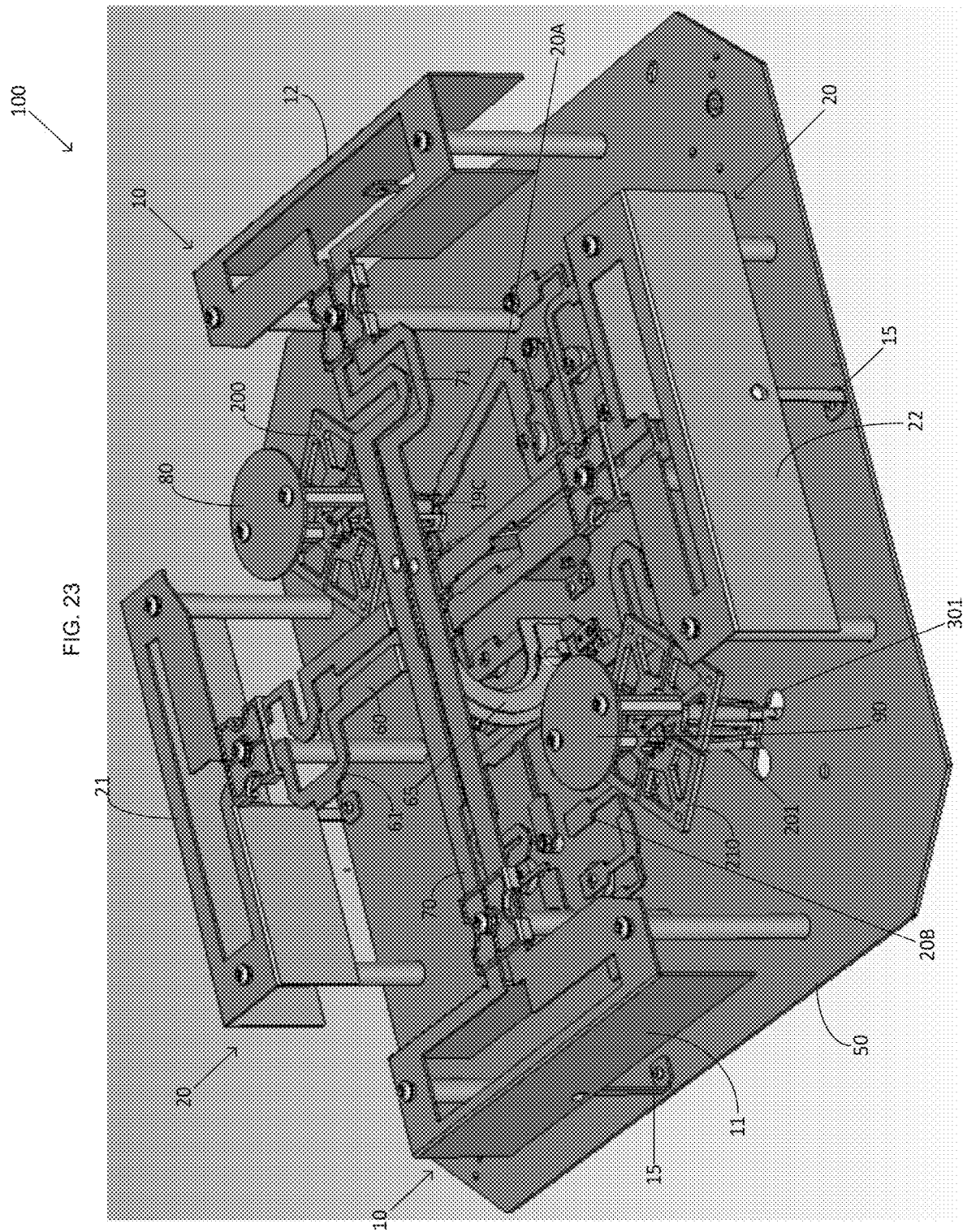
FIG. 23 is a perspective view of FIG. 8 showing the upper band antenna elements nested within the lower band antenna elements and the lower and upper feeding networks.

Referring to FIGS. 14, 21 and 22, the ends 19C, 19D of the horizontally arranged microstrip lines 19A, 19B of the lower feeding network 140 are configured to contact the first upper band antenna element 200. The horizontally arranged microstrip lines 19A, 19B form the duplexers 20A, 20B.

Upper Feeding Network

FIG. 20 shows the upper feeding network 130 configured to provide radiation performance in the wideband frequency range. The upper feeding network 130 has a low profile and is cost effective to manufacture.

Figure 8:
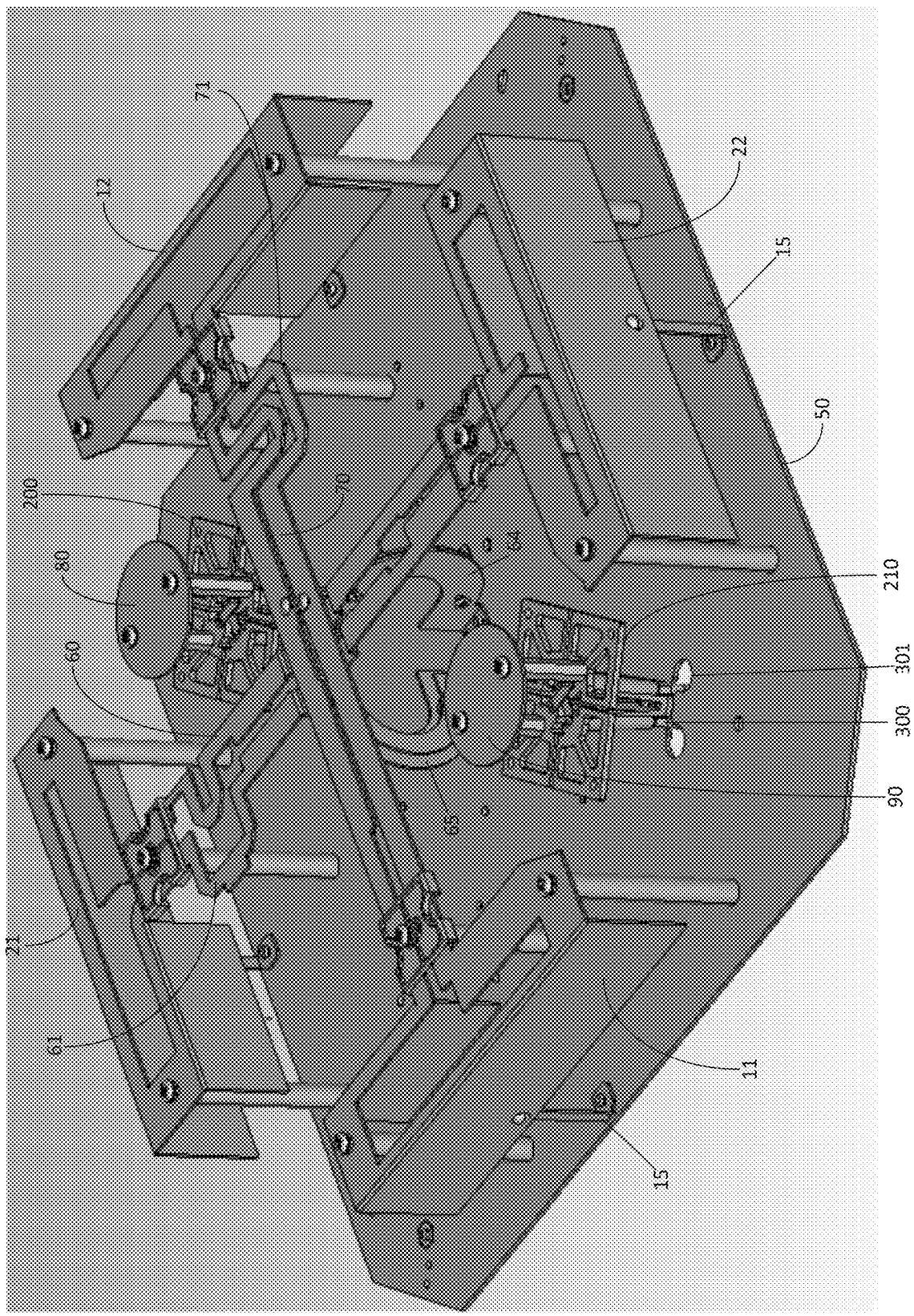
FIG. 8 is a perspective view of FIG. 4 depicting two orthogonal co-planar microstrip lines with meander sections configured to optimize the radiating performance of the antenna assembly, without showing the lower feeding network.
Figure 9:
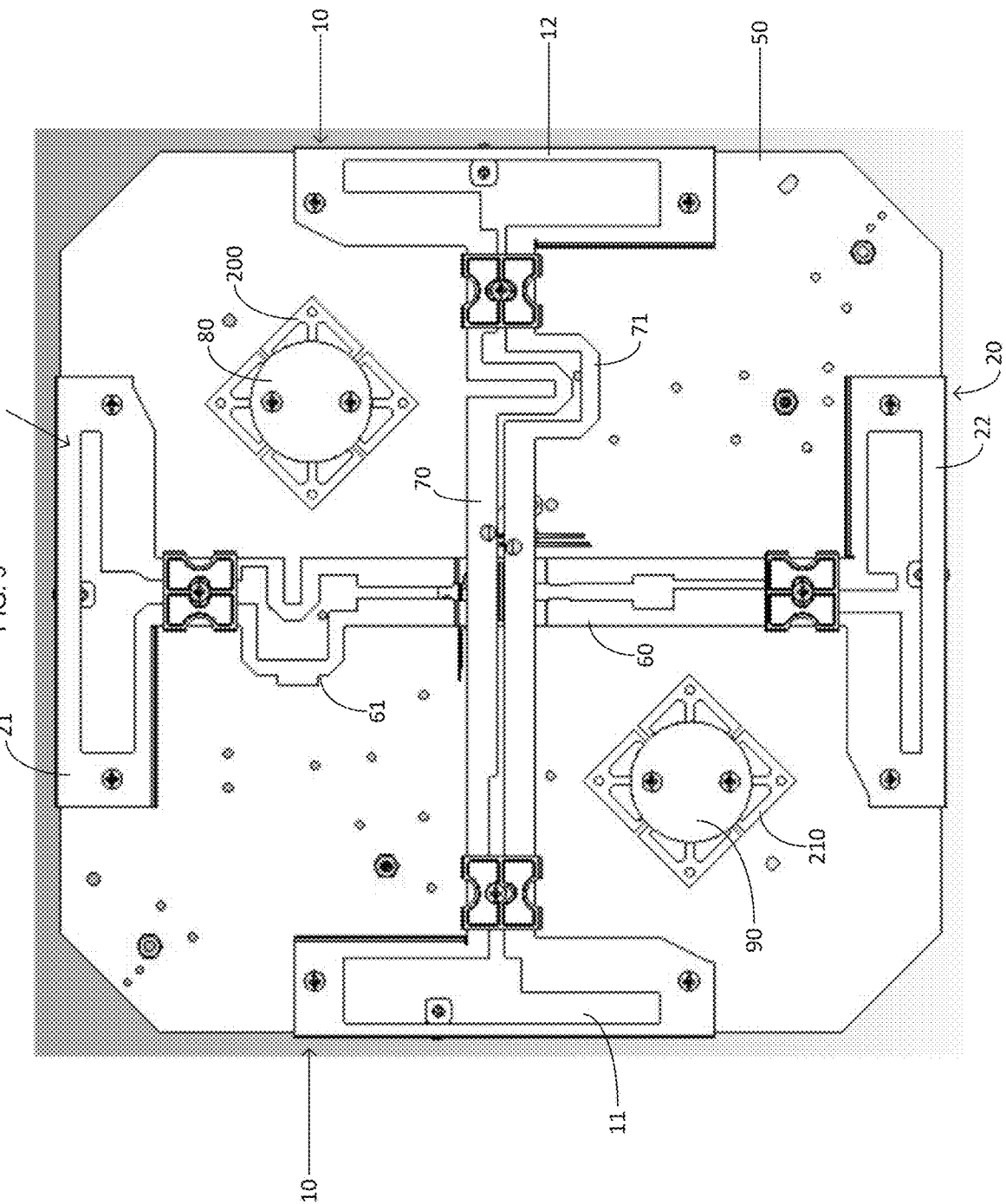
FIG. 9 is a top plan view of the preferred antenna assembly of FIG. 1 depicting the nested arrangement of the upper band antenna elements within the lower band antenna elements.

Referring to FIGS. 7 to 9, the upper feeding network 130 comprises co-planar microstrip lines 60, 70 positioned at a predetermined height above the ground plane 50 in an elevated horizontal plane substantially parallel to the ground plane 50. Preferably, the co-planar microstrip lines 60, 70 are positioned at about the same height as the upper surface of the folded dipoles 11, 12, 21, 22 of lower band antenna elements 10, 20. Each co-planar microstrip line 60, 70 comprises two tracks at held at a fixed distance from each other. Each pair of opposing folded dipoles 11, 12, 21, 22 is connected by a co-planar microstrip line 60, 70. Specifically, the pair of opposing folded dipoles 11, 12 of the first lower band antenna element 10 are connected to each other by a first co-planar microstrip line 70. The pair of opposing folded dipoles 21, 22 of the second lower band antenna element 20 are connected to each other by a second co-planar microstrip line 60. The co-planar microstrip lines 60, 70 form a balanced feeding network for the lower band antenna elements 10, 20 and creates a radiating aperture for each upper band antenna element 200, 210 to deliver more forward gain.

The upper feeding network 130 connects via the vertically arranged microstrip lines 64, 65 to the horizontally arranged microstrip lines 19A, 19B. The vertically arranged microstrip lines 64, 65 connect the lower feeding network 140 to the horizontal co-planar microstrip lines 60, 70 at about a central location on the ground plane 50.

Each co-planar microstrip line 60, 70 has meander lines or meander sections 61, 71 that are introduced along a portion of the co-planar microstrip line 60, 70 for optimising the radiation pattern of the lower band antenna elements 10, 20. The point of connection of the vertically arranged microstrip lines 64, 65 with the co-planar microstrip line 60, 70 is the middle of the length of the co-planar microstrip lines 60, 70.

Figure 5:
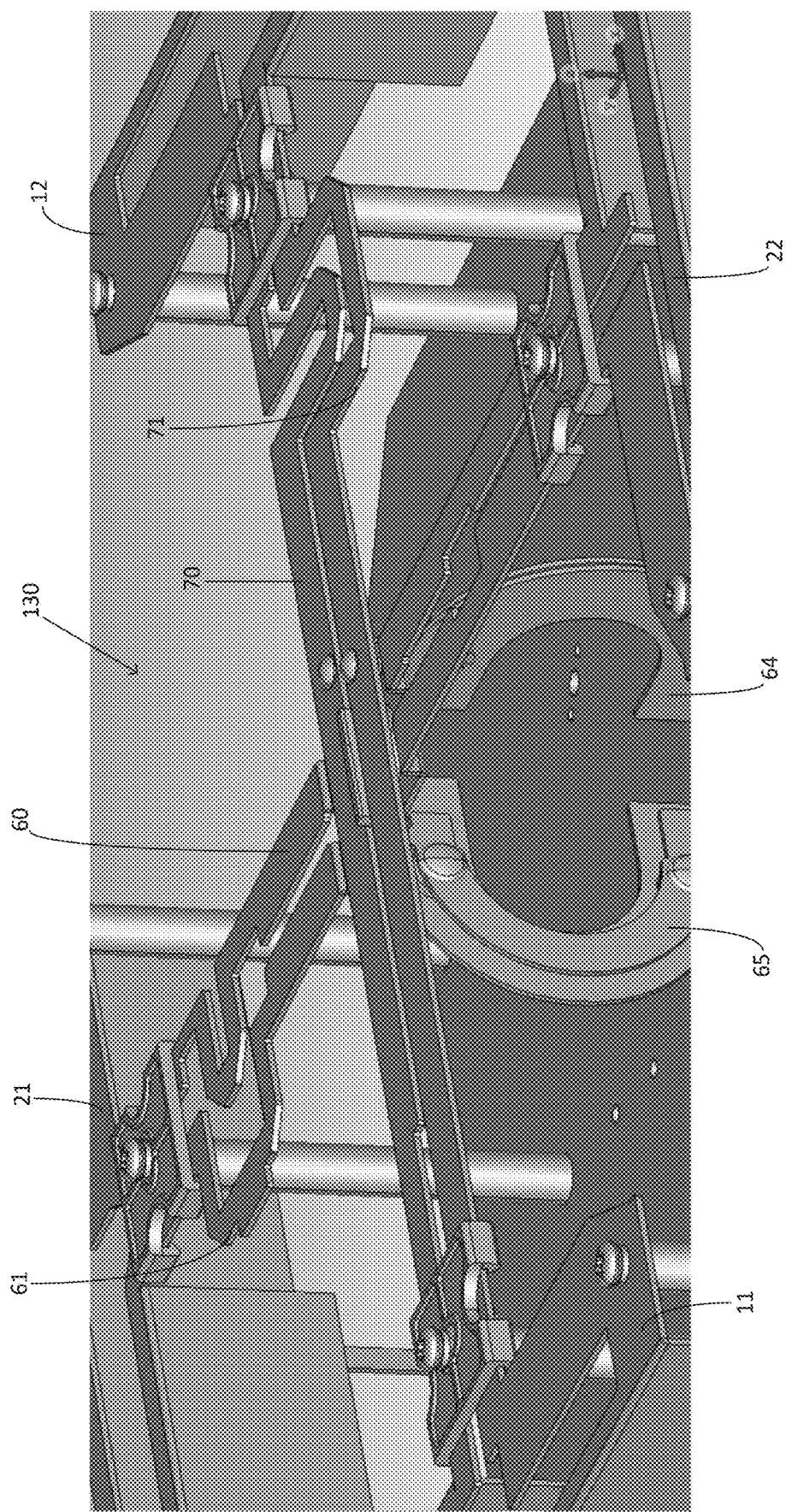
FIG. 5 is a magnified perspective view of FIG. 4 depicting two orthogonally disposed co-planar microstrip lines of an upper feeding network.
Figure 6:
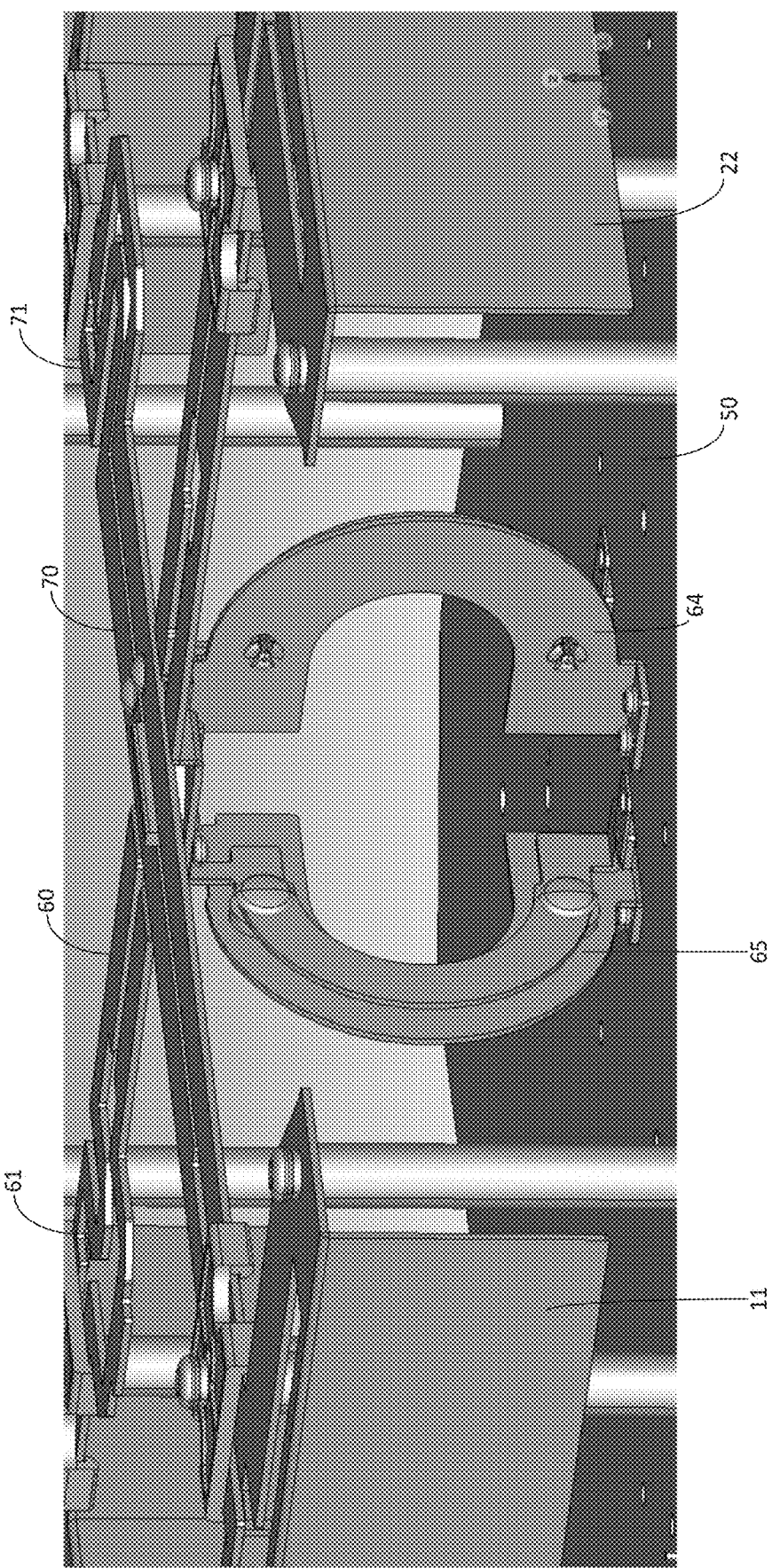
FIG. 6 is a magnified perspective view of FIG. 4 depicting two vertically arranged microstrip lines of the lower feeding network configured to additionally feed the pair of lower band antenna elements.

Referring to FIGS. 5 and 6, each co-planar microstrip line 60, 70 is further fed with a wideband matching network by using the vertically arranged microstrip lines 64, 65 in order to provide ultra-wideband performance for the antenna assembly 100. The horizontal co-planar microstrip lines 60, 70 and vertically arranged microstrip lines 64, 65 are combined to feed the lower band antenna elements 10, 20.

A first vertically arranged microstrip line 64 connects the co-planar microstrip line 60 to the horizontally arranged microstrip line 19B. Each C-shaped member of the first vertically arranged microstrip line 64 is connected to a corresponding track of the co-planar microstrip line 60. A second vertically arranged microstrip line 65 connects the co-planar microstrip line 70 to the horizontally arranged microstrip line 19A. Each C-shaped member of the second vertically arranged microstrip line 65 is connected to a corresponding track of the co-planar microstrip line 70. The vertically arranged microstrip lines 64, 65 are preferably held in an upright position relative to the ground plane 50.

Ultra-Wideband Duplexers

Figure 19:
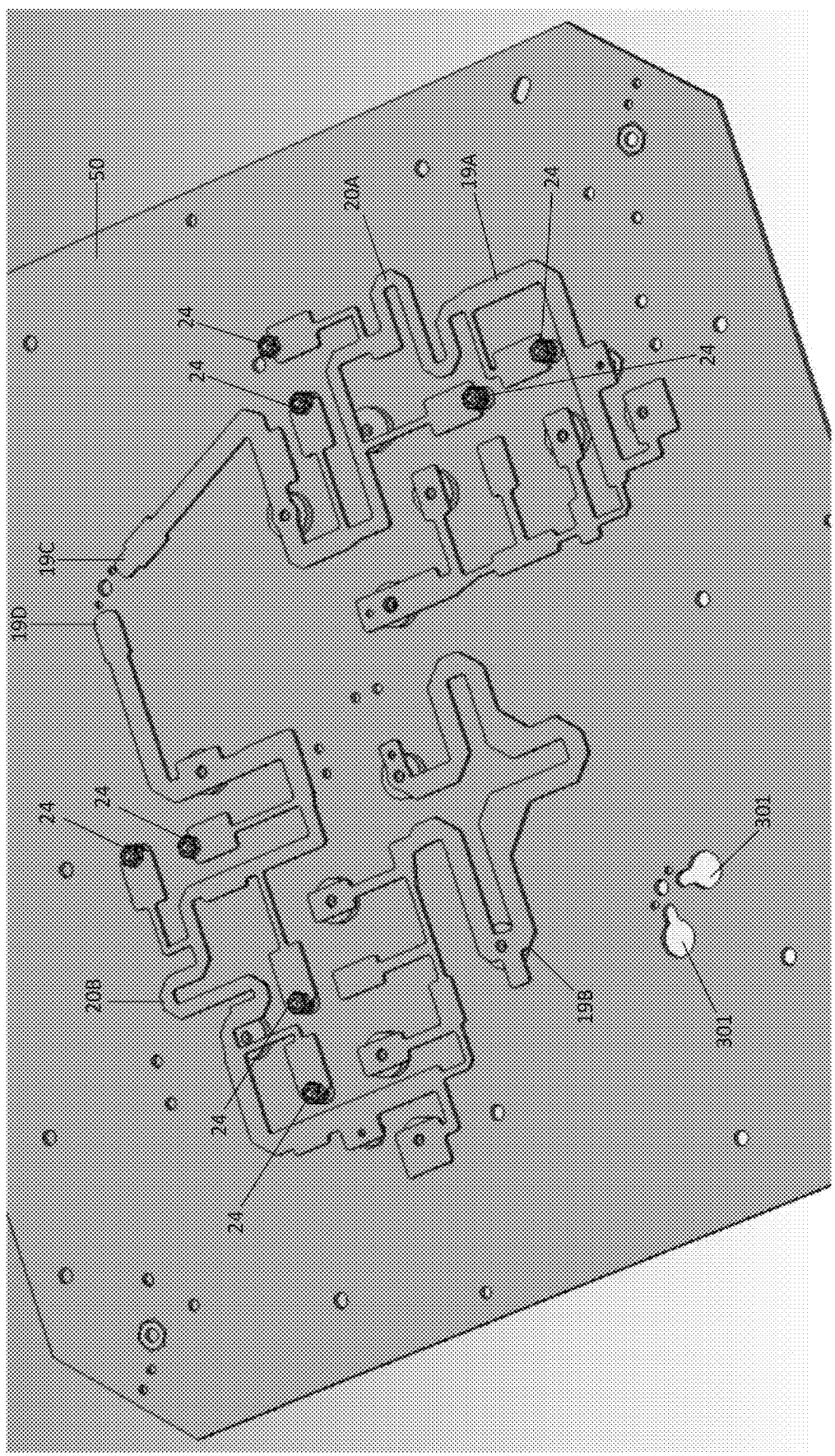
FIG. 19 is a top perspective view of the duplexer set of FIG. 15.

Referring to FIGS. 18 and 19, two separate and distinct ultra-wideband duplexers 20A, 20B are provided. The set of ultra-wideband duplexers 20A, 20B is also nested within the lower band antenna element 10, 20. Each ultra-wideband duplexer 20A, 20B is to provide individual polarisation of the ultra-wideband network. Each ultra-wideband duplexer 20A, 20B is configured to combine or split the lower feeding network 140 to the lower band antenna elements 10, 20 and split the lower feeding network 140 to the first upper band antenna element 200. The ultra-wideband duplexer 20A, 20B functions as a band pass filter and a band reject filter, with multiple half-wave length operating as band pass filter and multiple quarter-wave length operating as band reject filter.

Figure 24:
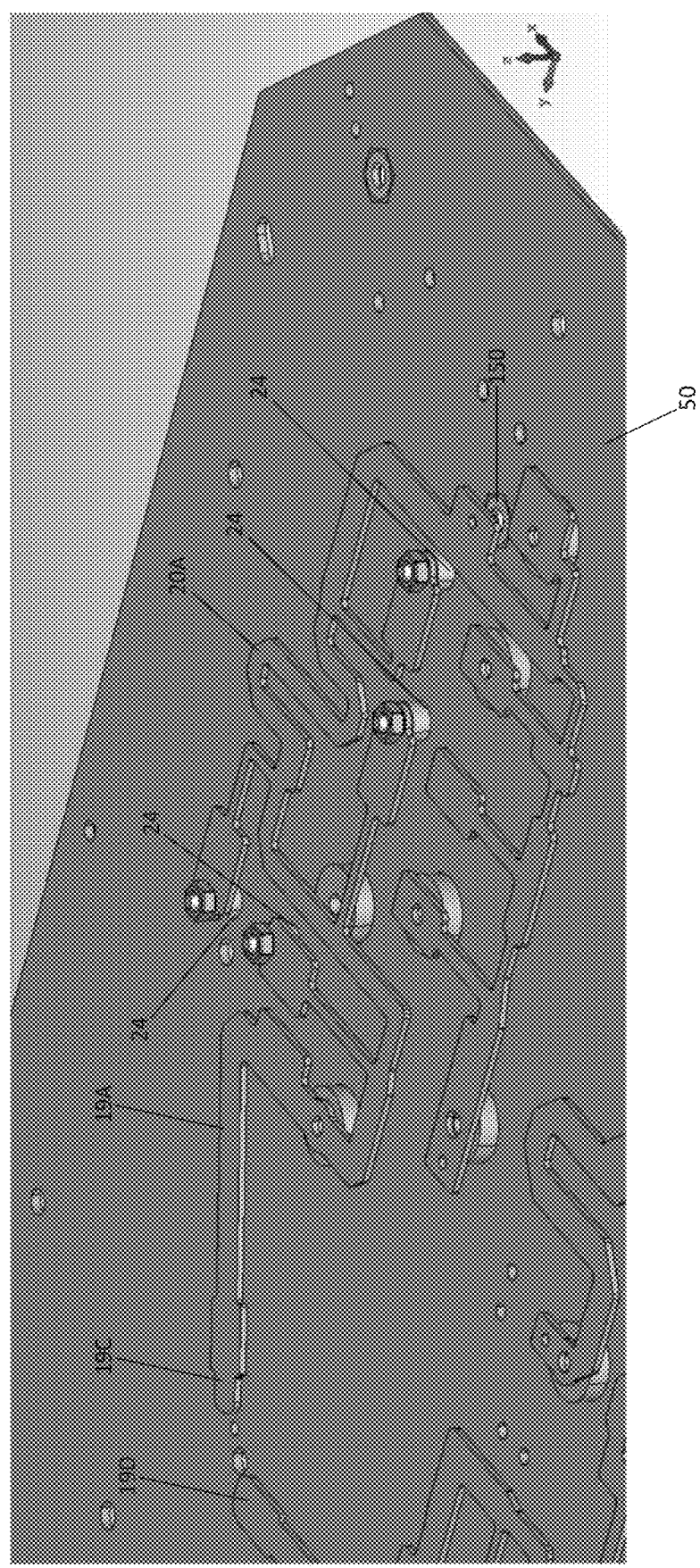
FIG. 24 is a perspective view of FIG. 17 depicting a shorting arrangement of multiple quarter wave lengths.
Figure 25:
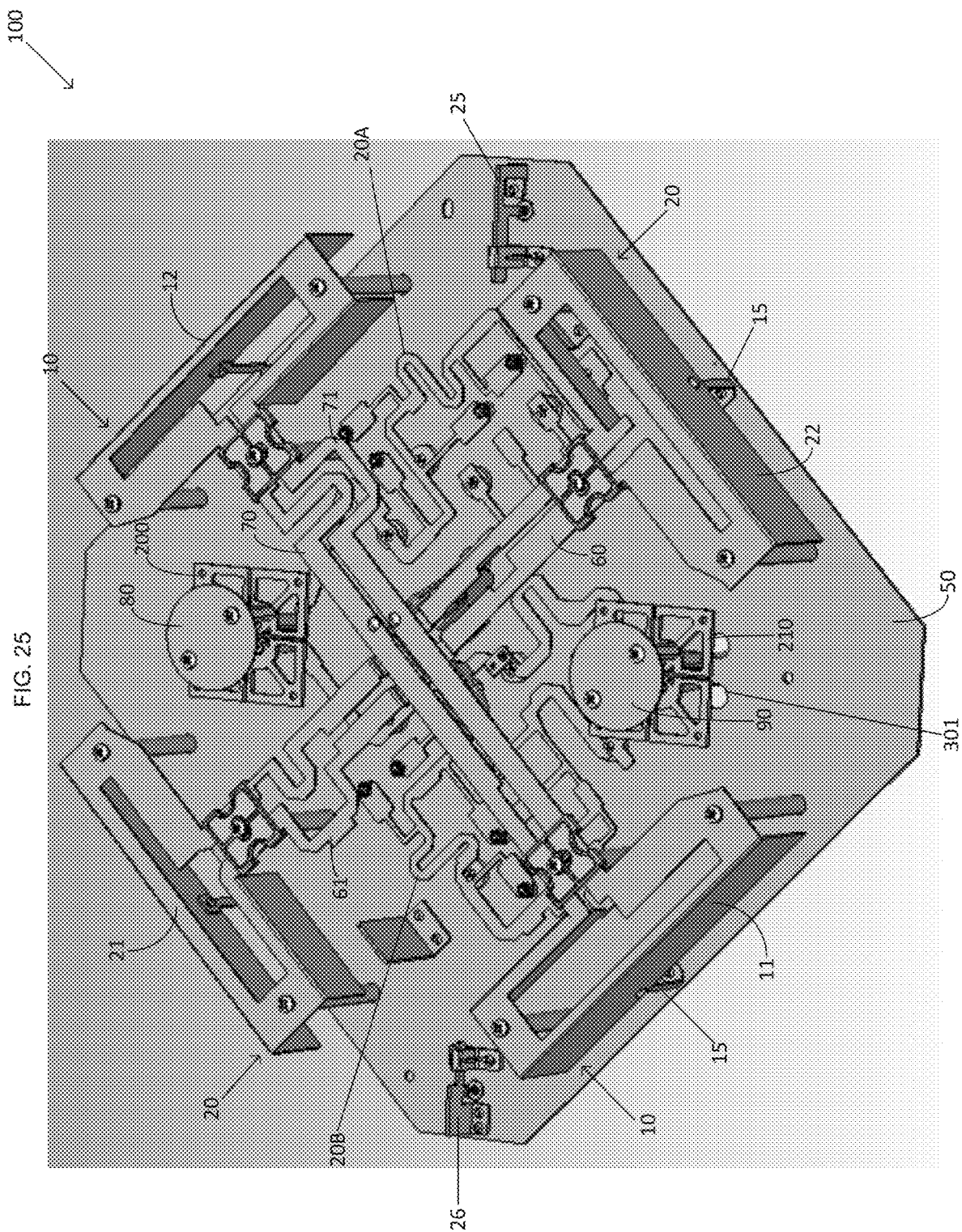
FIG. 25 is a perspective view of FIG. 23 additionally nested with GPS and WiFi antennas.
Figure 26:
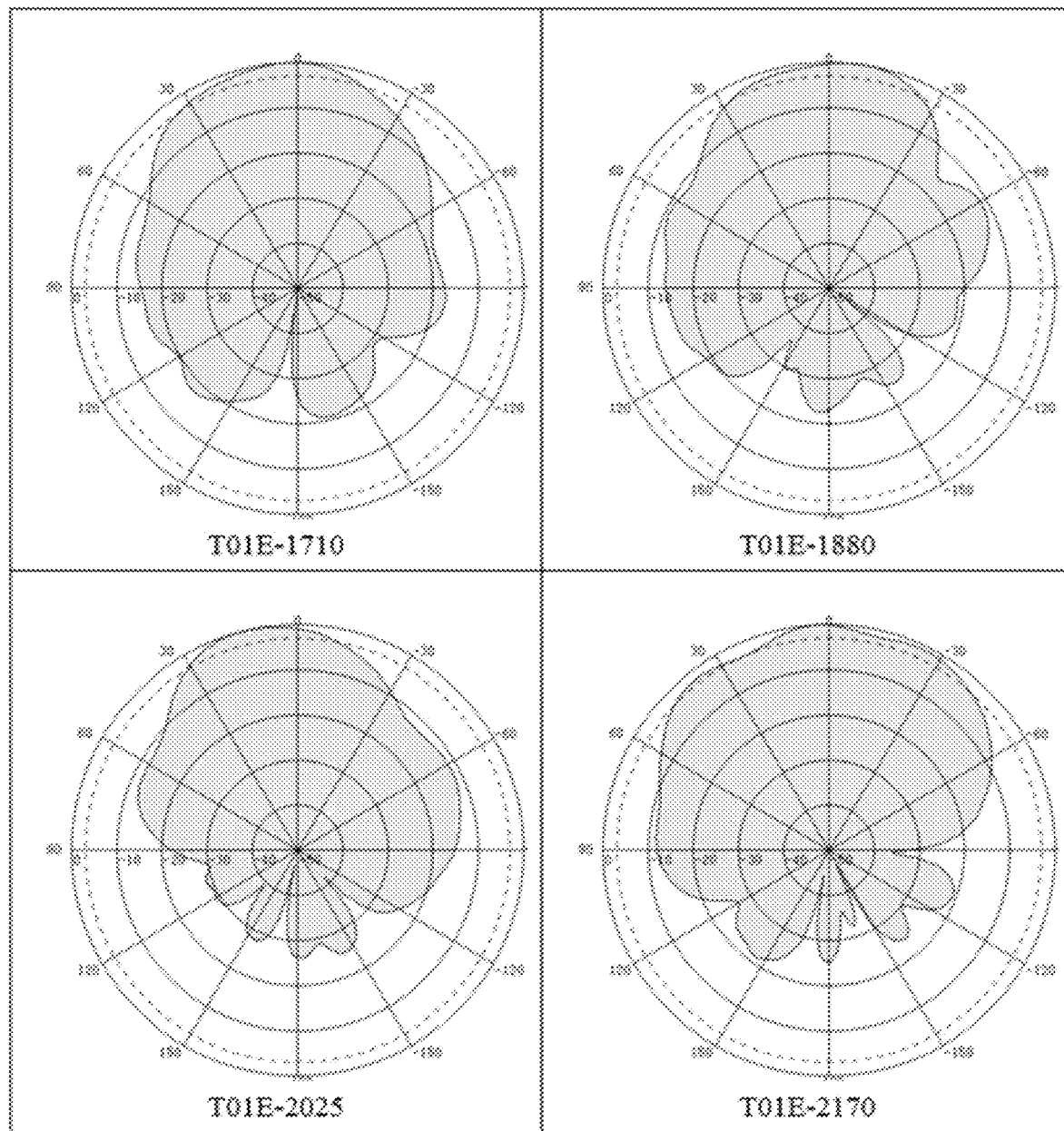
FIG. 26 is series of radiation pattern diagrams of the first upper band antenna element at 1710 MHz, 1880 MHz, 2025 MHz and 2170 MHz.
Figure 27:
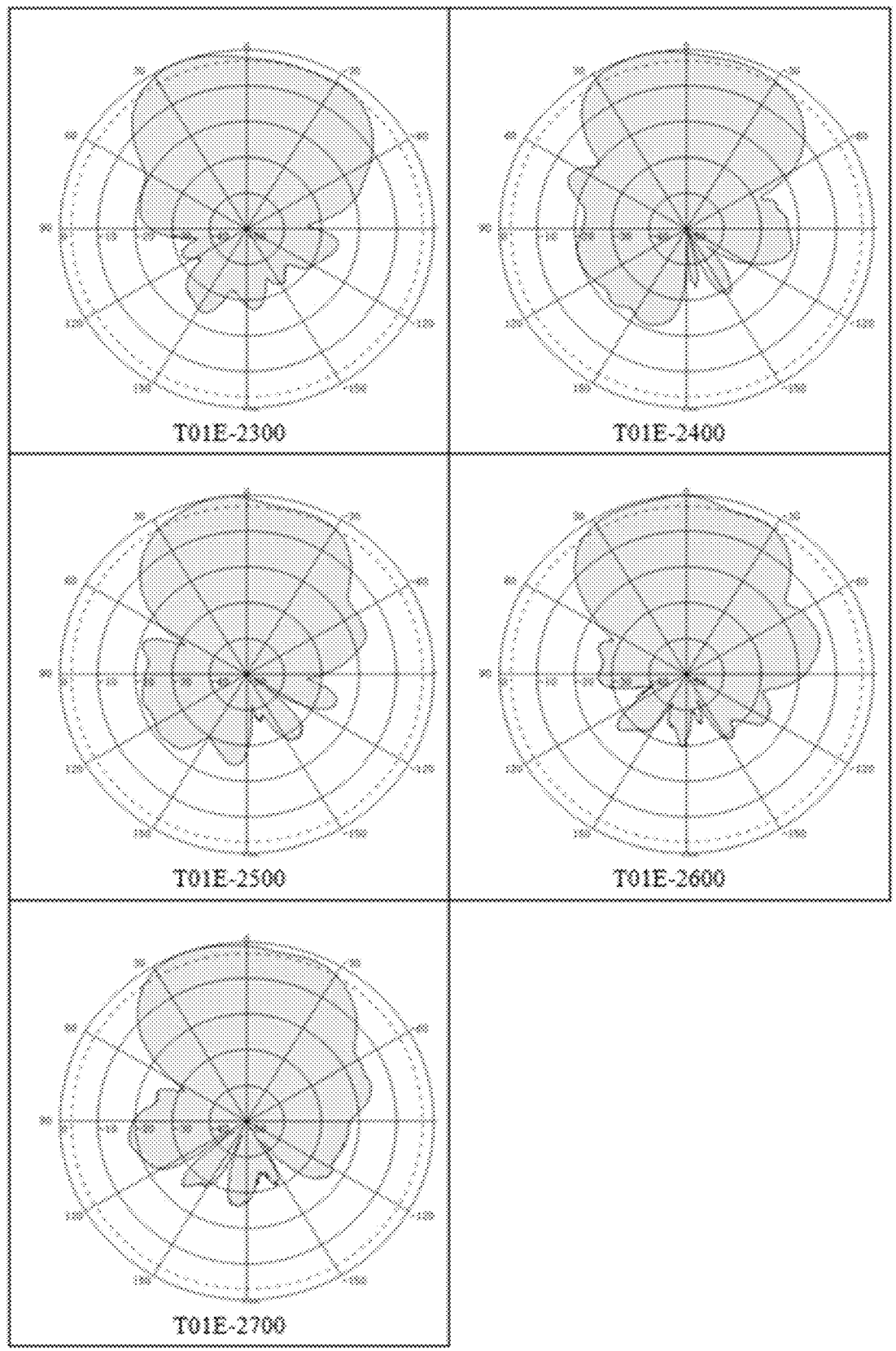
FIG. 27 is series of radiation pattern diagrams of the first upper band antenna element at 2300 MHz, 2400 MHz, 2500 MHz, 2600 MHz and 2700 MHz.
Figure 28:
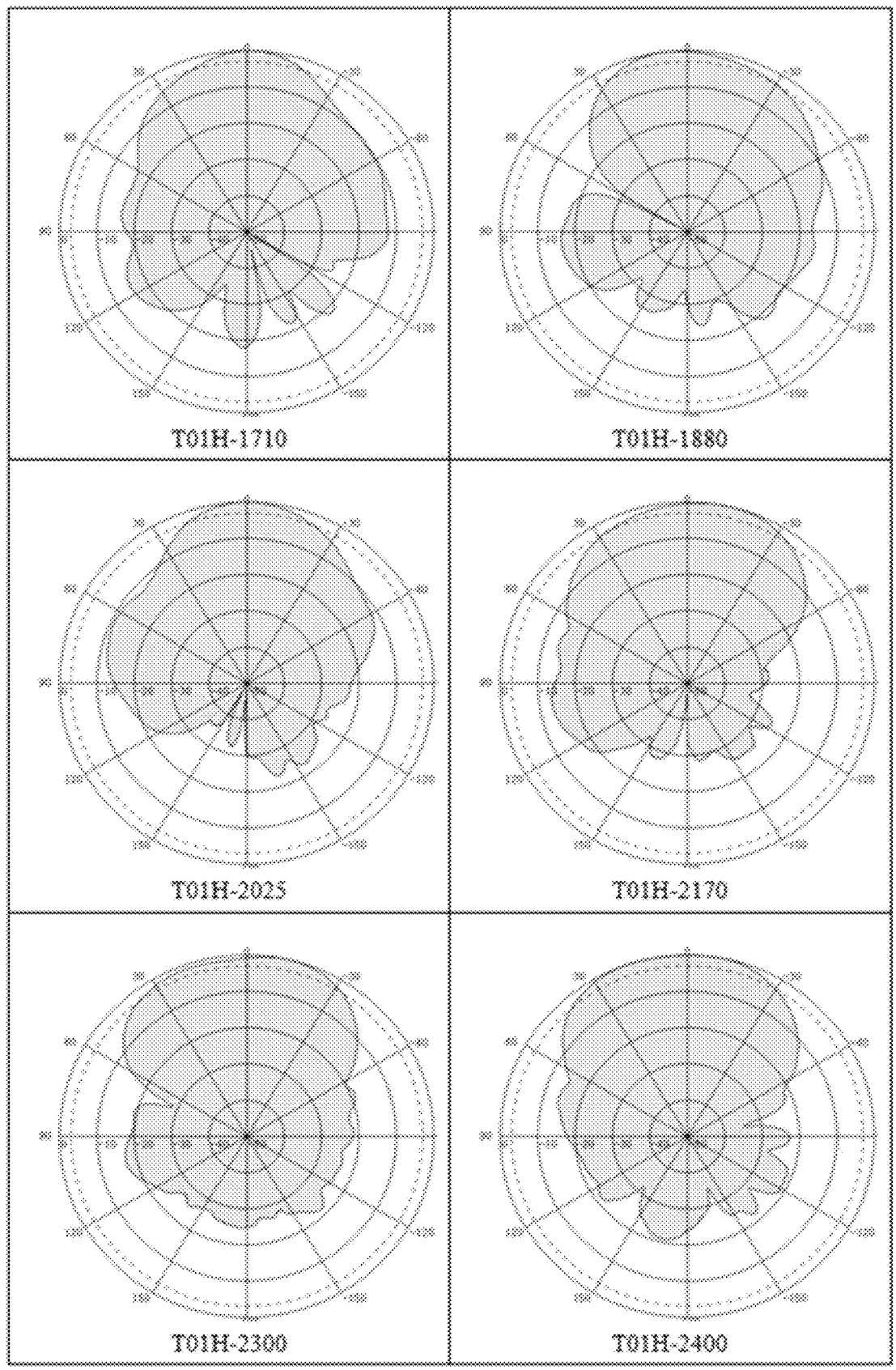
FIG. 28 is series of radiation pattern diagrams of the first upper band antenna element at 1710 MHz, 1880 MHz, 2025 MHz, 2170 MHz, 2300 MHz and 2400 MHz.
Figure 29:
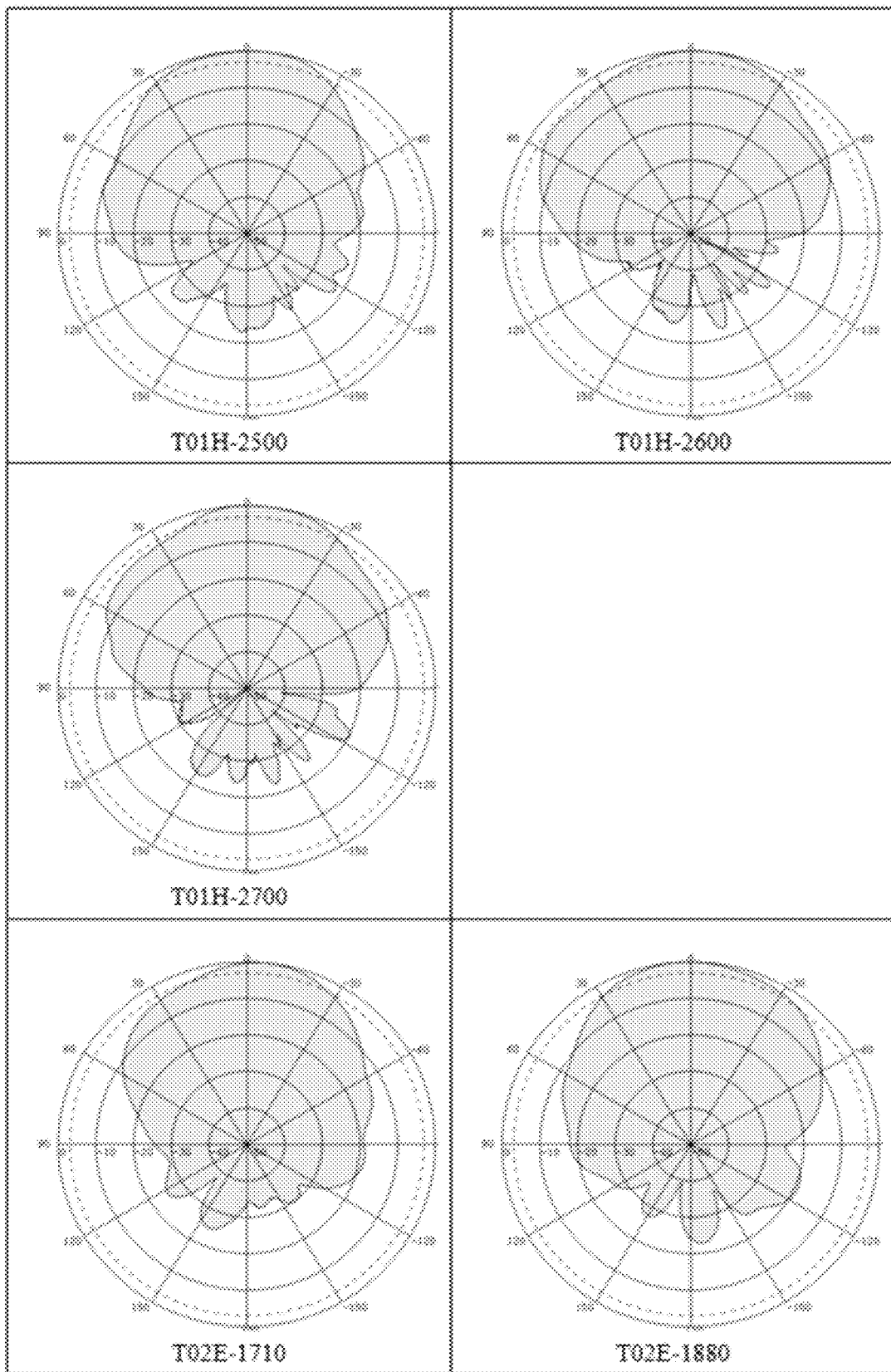
FIG. 29 is series of radiation pattern diagrams of the first upper band antenna element at 2500 MHz, 2600 MHz, 2700 MHz, 1710 MHz, and 1880 MHz.
Figure 30:
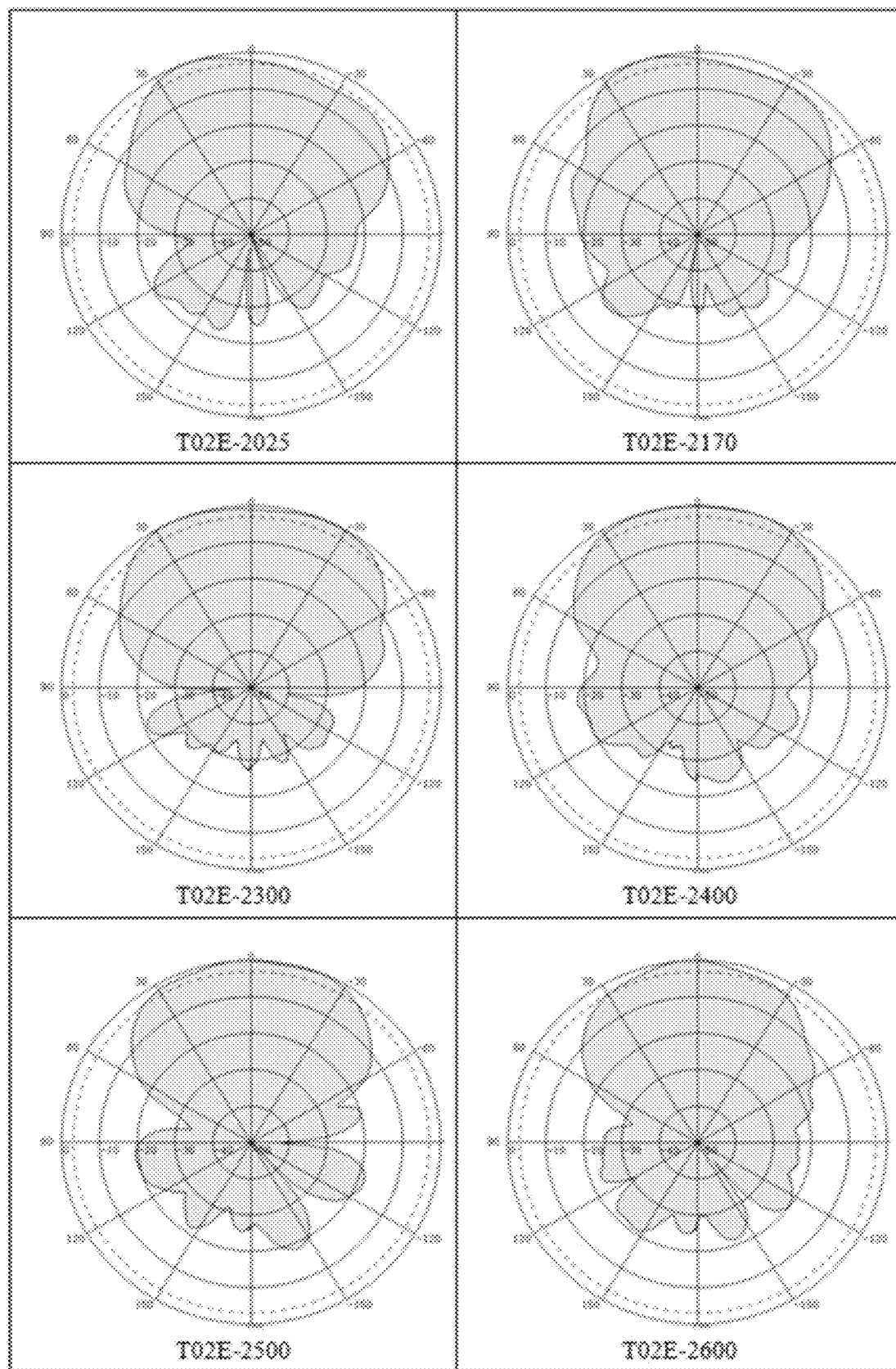
FIG. 30 is series of radiation pattern diagrams of the first upper band antenna element at 2025 MHz, 2170 MHz, 2300 MHz, 2400 MHz, 2500 MHz and 2600 MHz.
Figure 31:
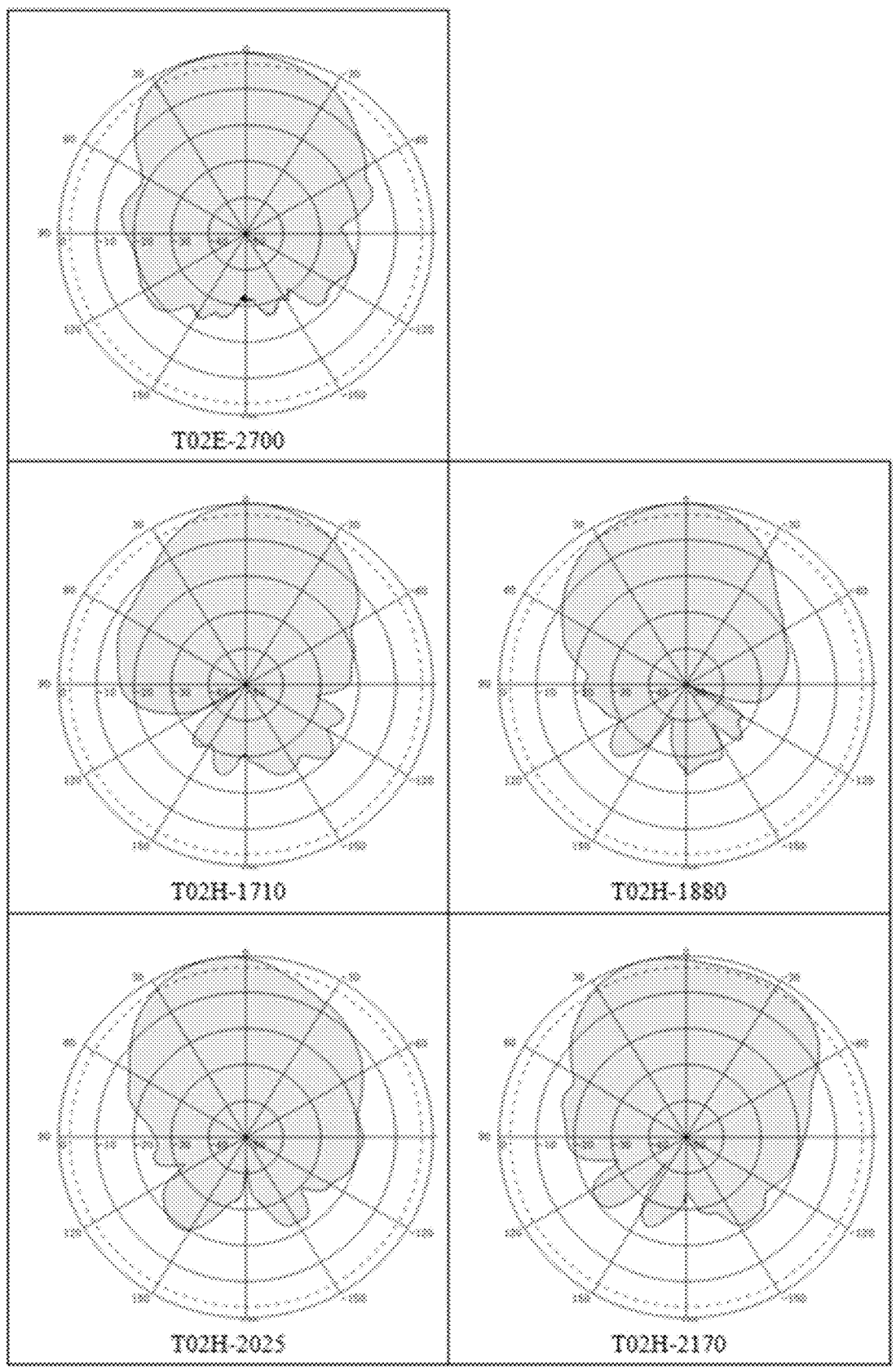
FIG. 31 is series of radiation pattern diagrams of the first upper band antenna element at 2700 MHz, 1710 MHz, 1880 MHz, 2025 MHz, and 2170 MHz.
Figure 32:
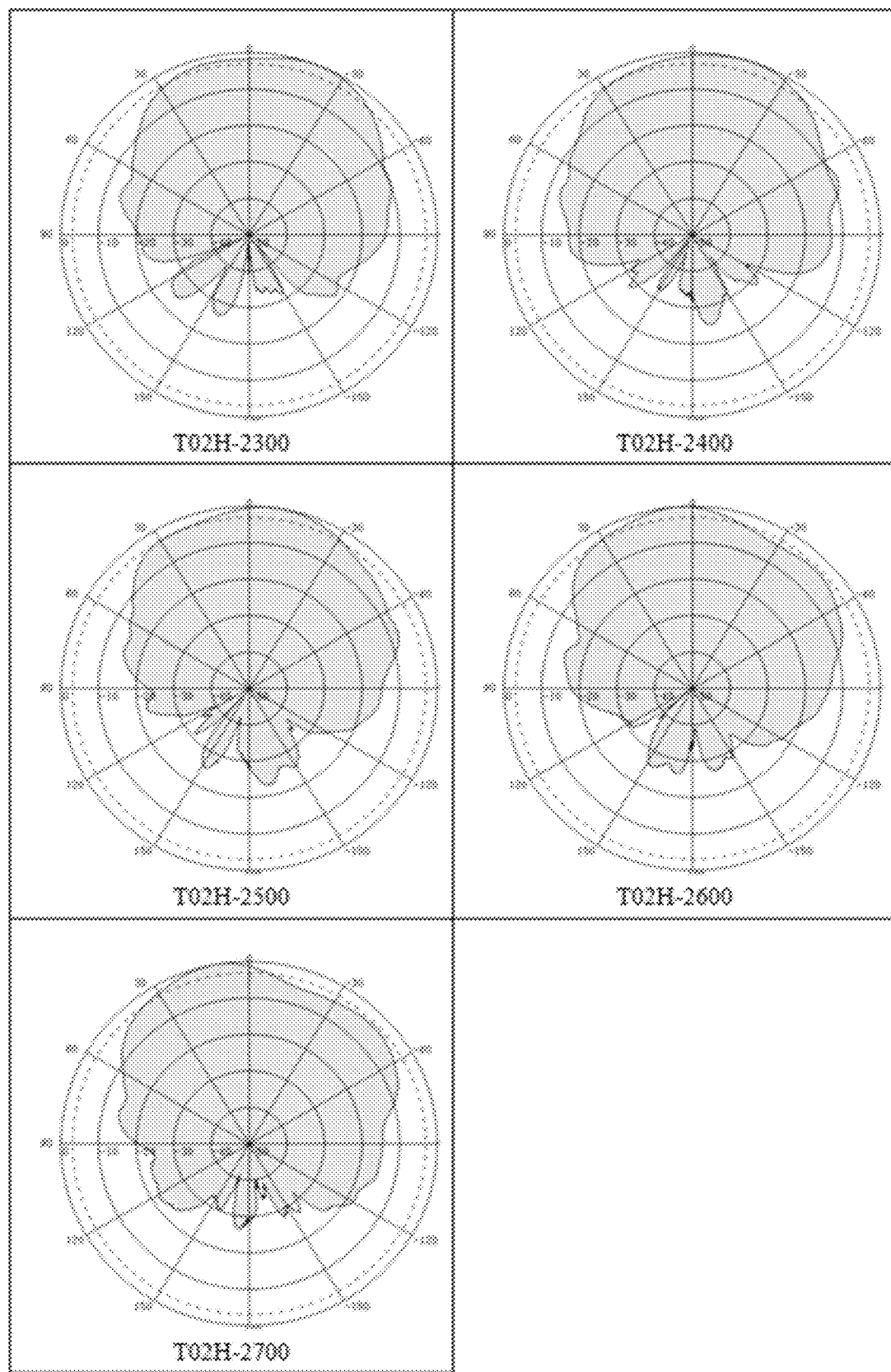
FIG. 32 is series of radiation pattern diagrams of the first upper band antenna element at 2300 MHz, 2400 MHz, 2500 MHz, 2600 MHz, and 2700 MHz.
Figure 33:
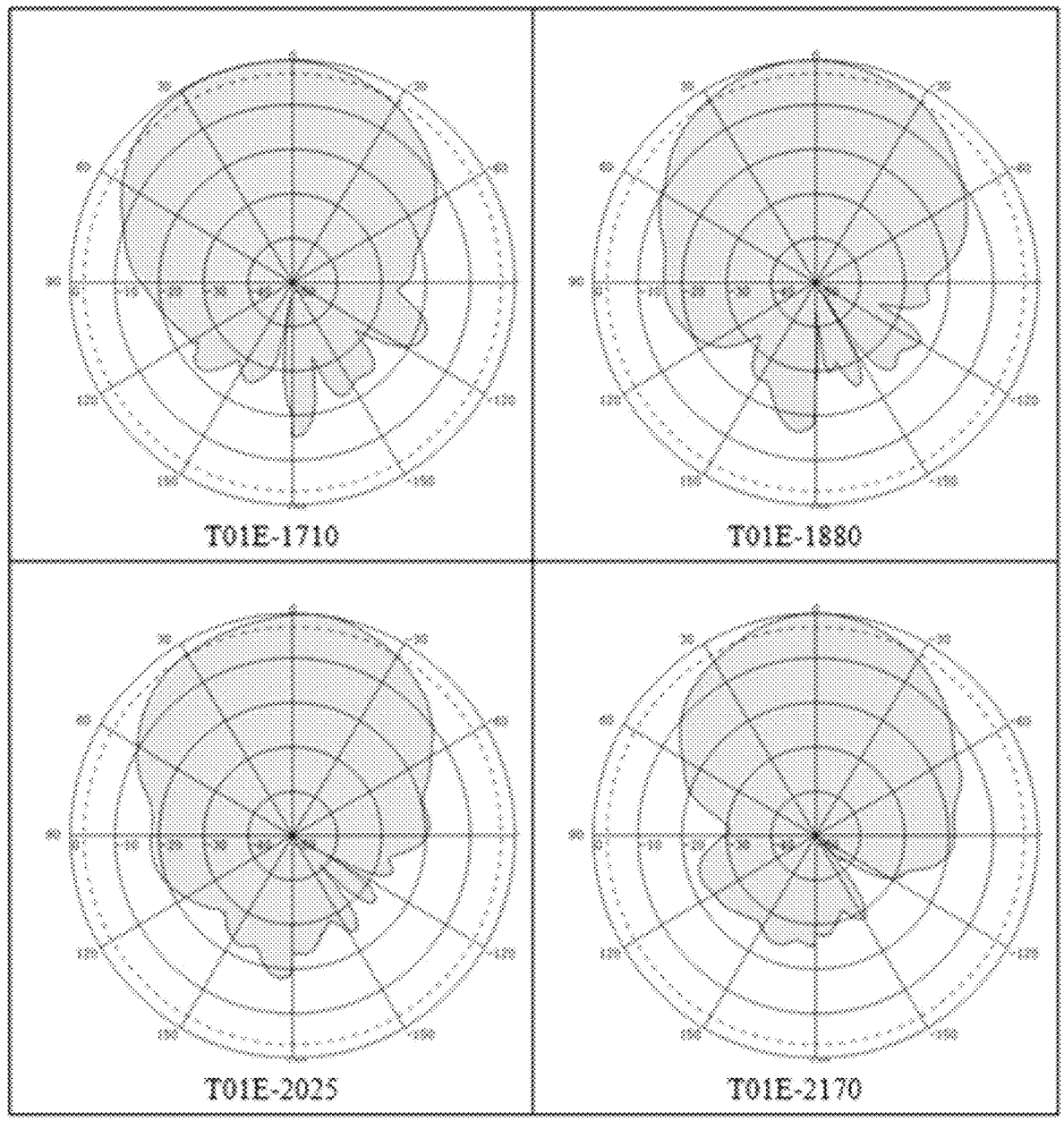
FIG. 33 is series of radiation pattern diagrams of the second upper band antenna element at 1710 MHz, 1880 MHz, 2025 MHz, and 2170 MHz.
Figure 34:
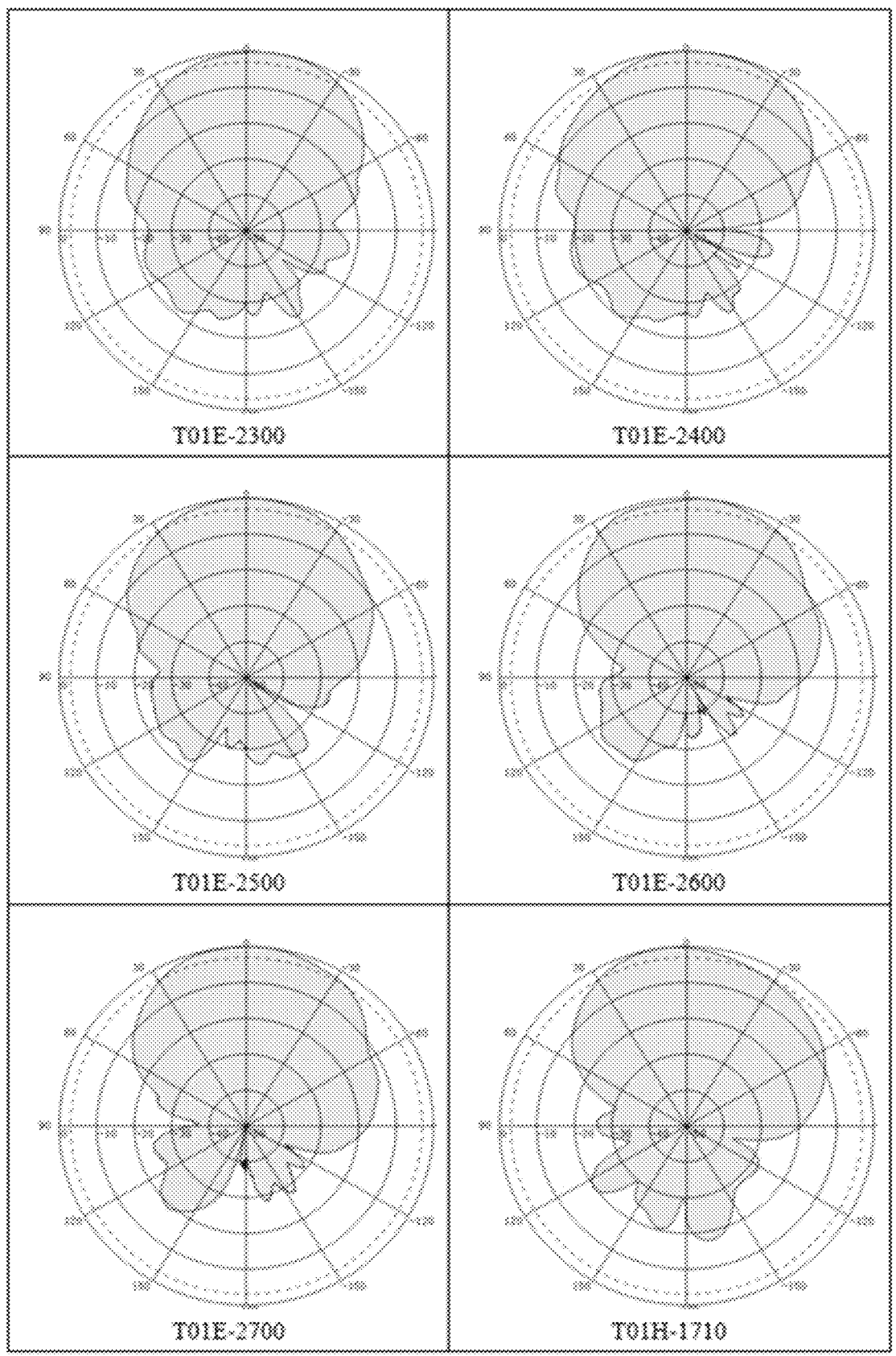
FIG. 34 is series of radiation pattern diagrams of the second upper band antenna element at 2300 MHz, 2400 MHz, 2500 MHz, 2600 MHz, 2700 MHz and 1710 MHz.
Figure 35:
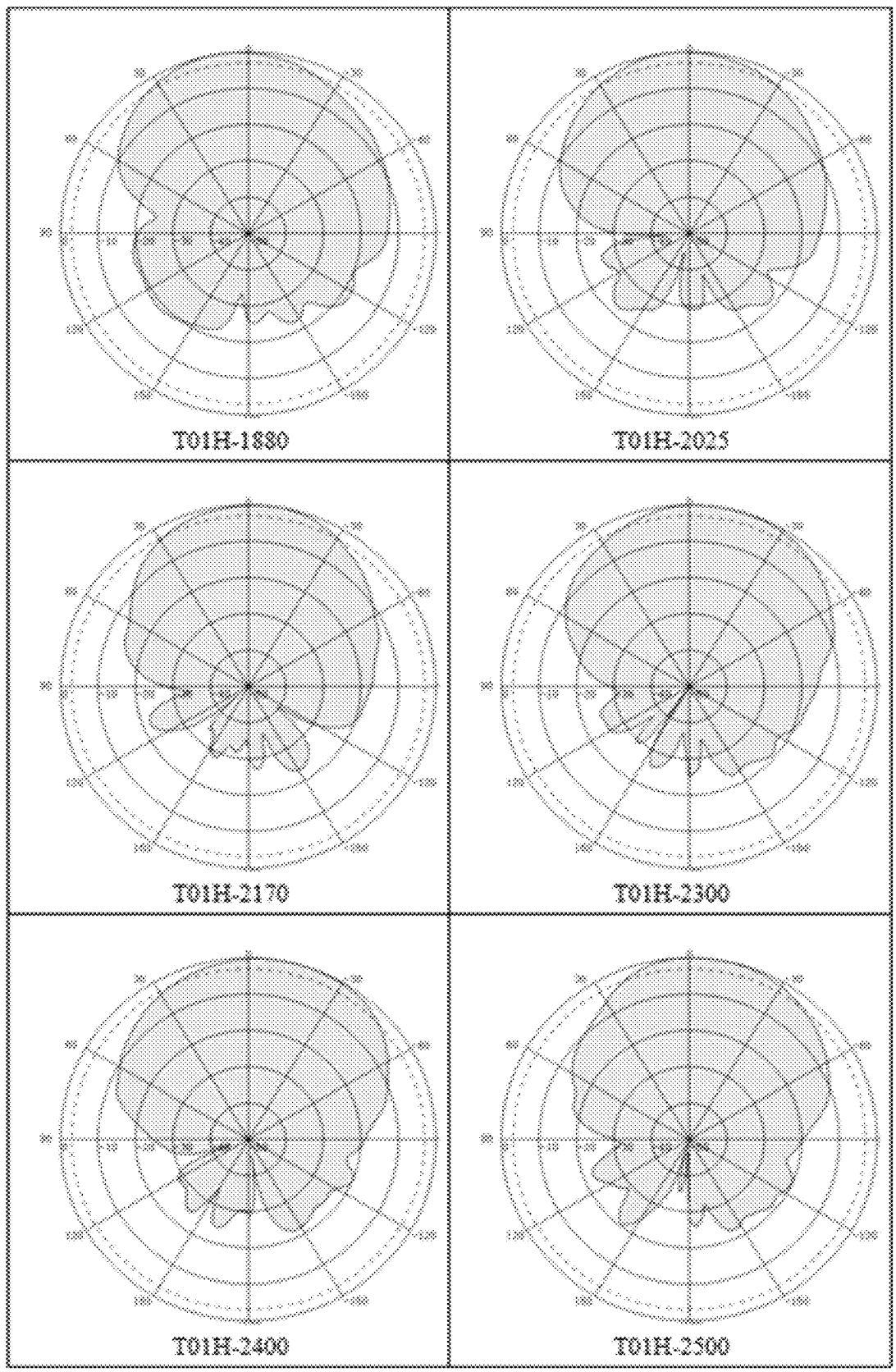
FIG. 35 is series of radiation pattern diagrams of the second upper band antenna element at 1880 MHz, 2025 MHz, 2170 MHz, 2300 MHz, 2400 MHz and 2500 MHz.
Figure 36:
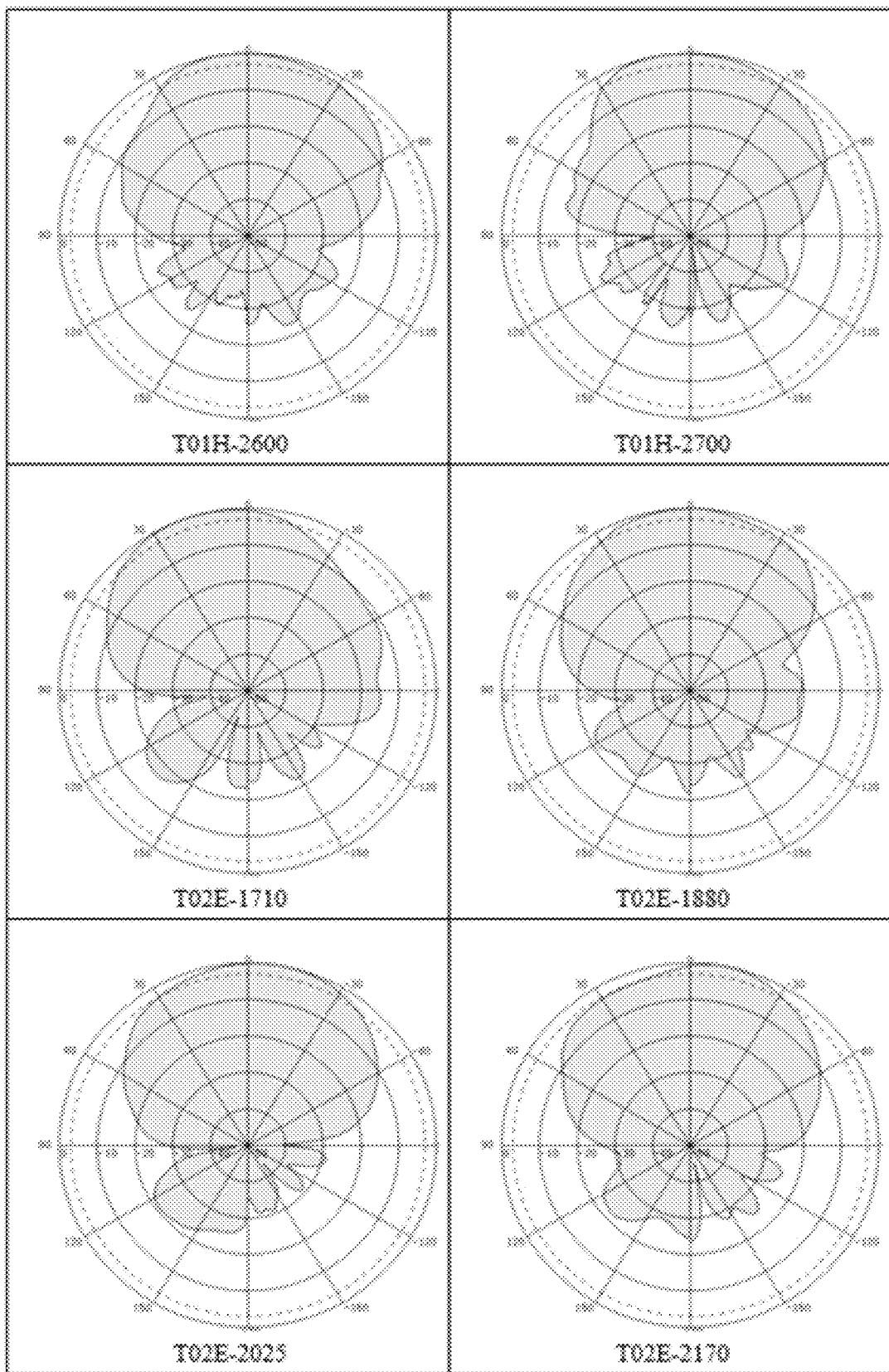
FIG. 36 is series of radiation pattern diagrams of the second upper band antenna element at 2600 MHz, 2700 MHz, 1710 MHz, 1880 MHz, 2025 MHz and 2170 MHz.
Figure 37:
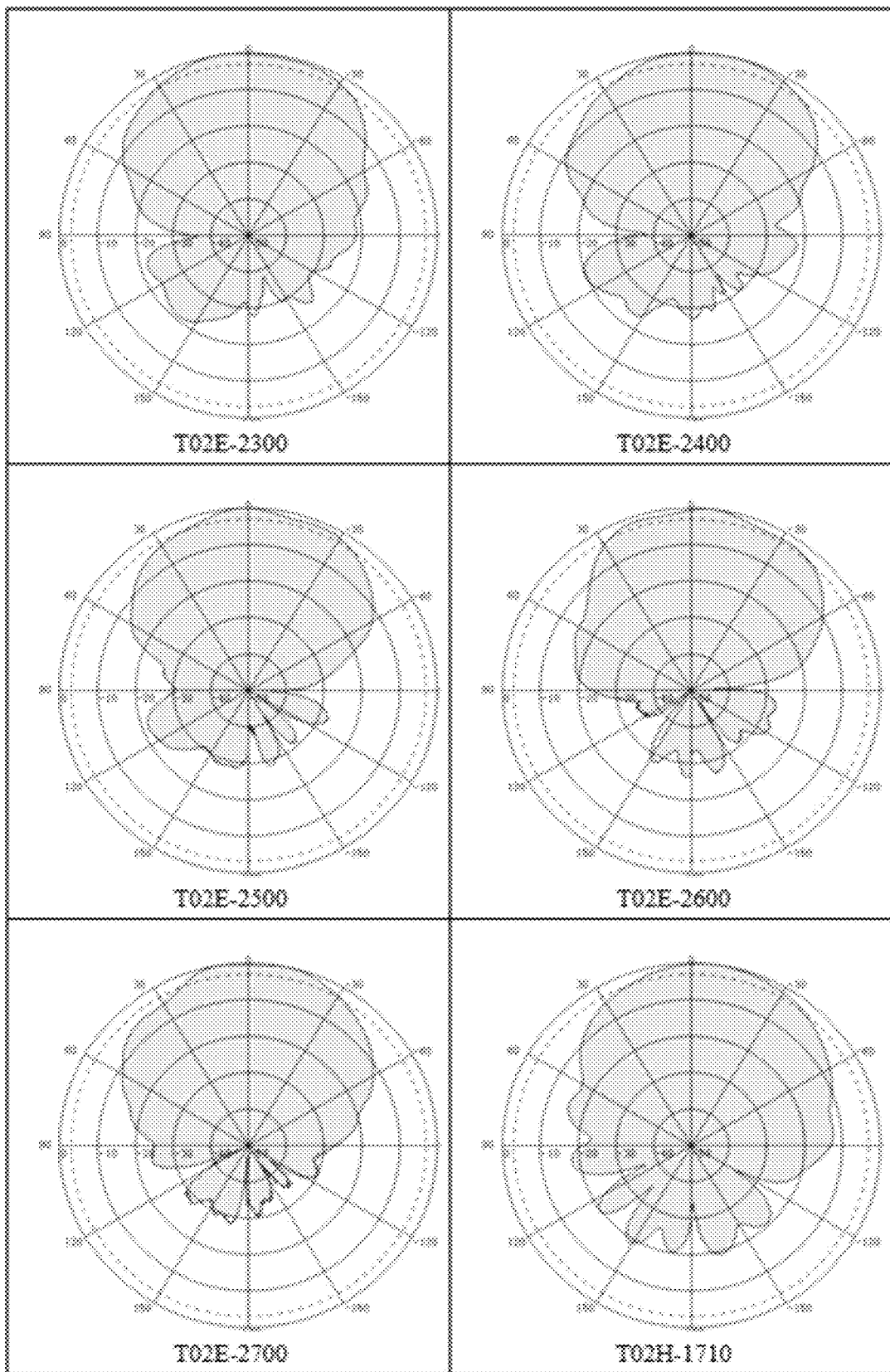
FIG. 37 is series of radiation pattern diagrams of the second upper band antenna element at 2300 MHz, 2400 MHz, 2500 MHz, 2600 MHz, 2700 MHz and 1710 MHz.
Figure 38:
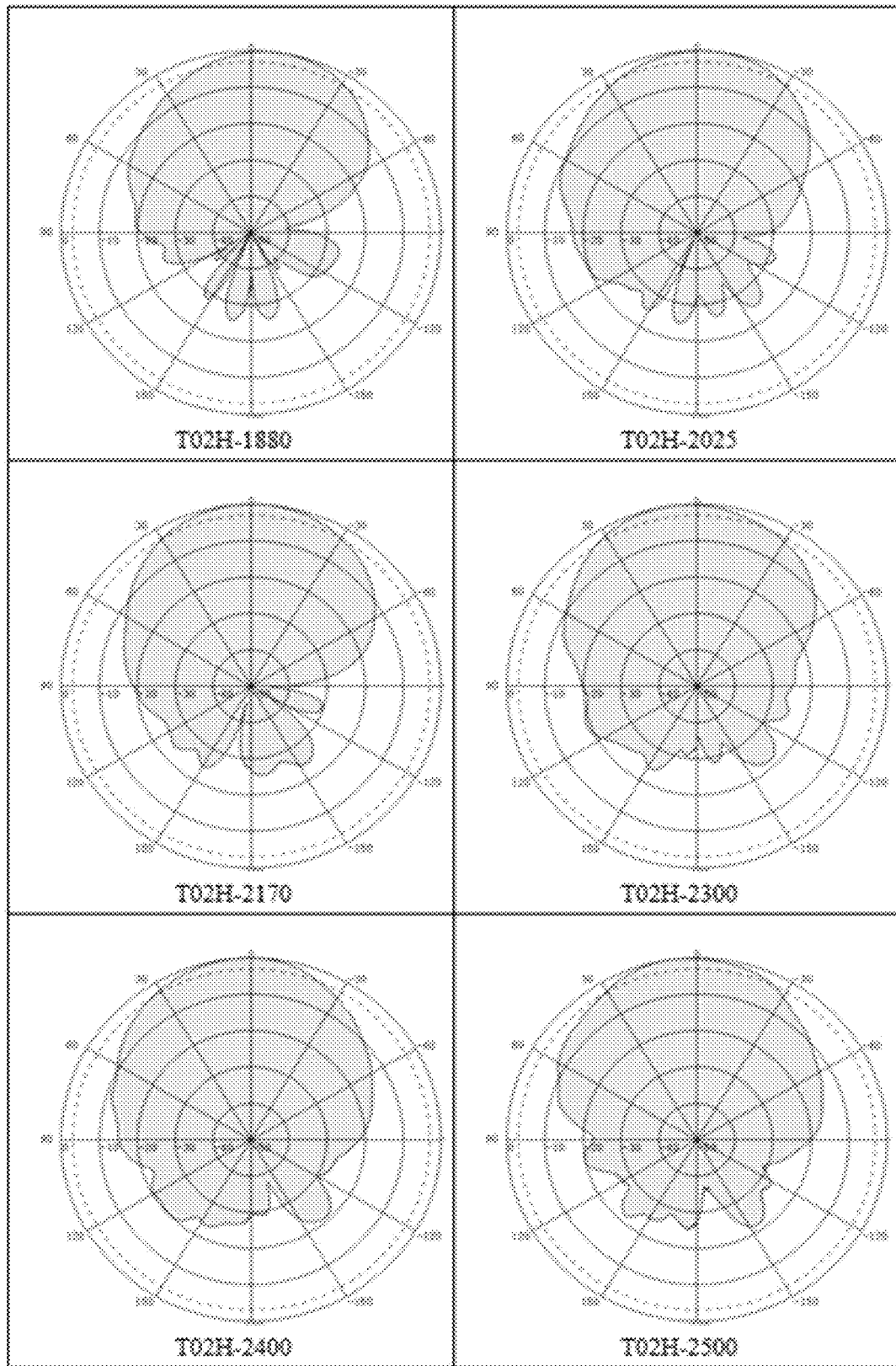
FIG. 38 is series of radiation pattern diagrams of the second upper band antenna element at 1880 MHz, 2025 MHz, 2170 MHz, 2300 MHz, 2400 MHz and 2500 MHz.
Figure 39:
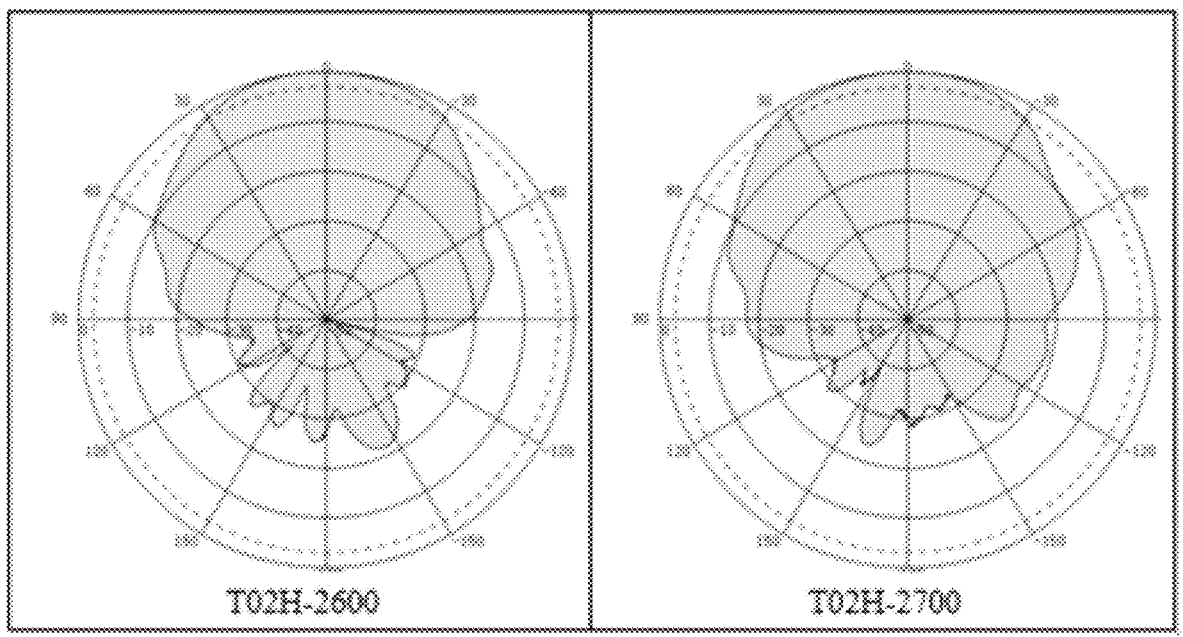
FIG. 39 is series of radiation pattern diagrams of the second upper band antenna element at 2600 MHz and 2700 MHz.
Figure 40:
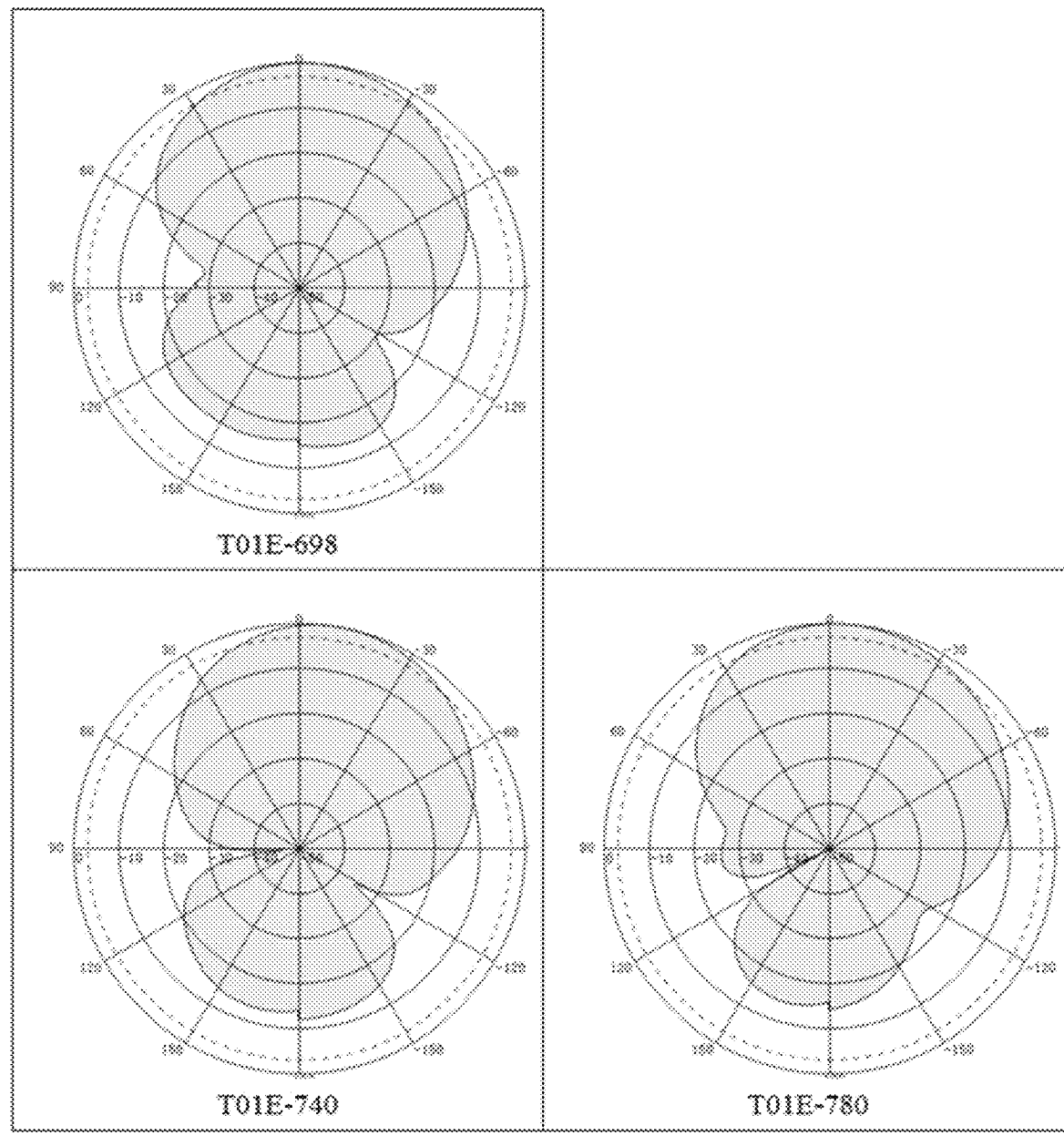
FIG. 40 is series of radiation pattern diagrams of a lower band antenna element at 698 MHz, 740 MHz and 780 MHz.
Figure 41:
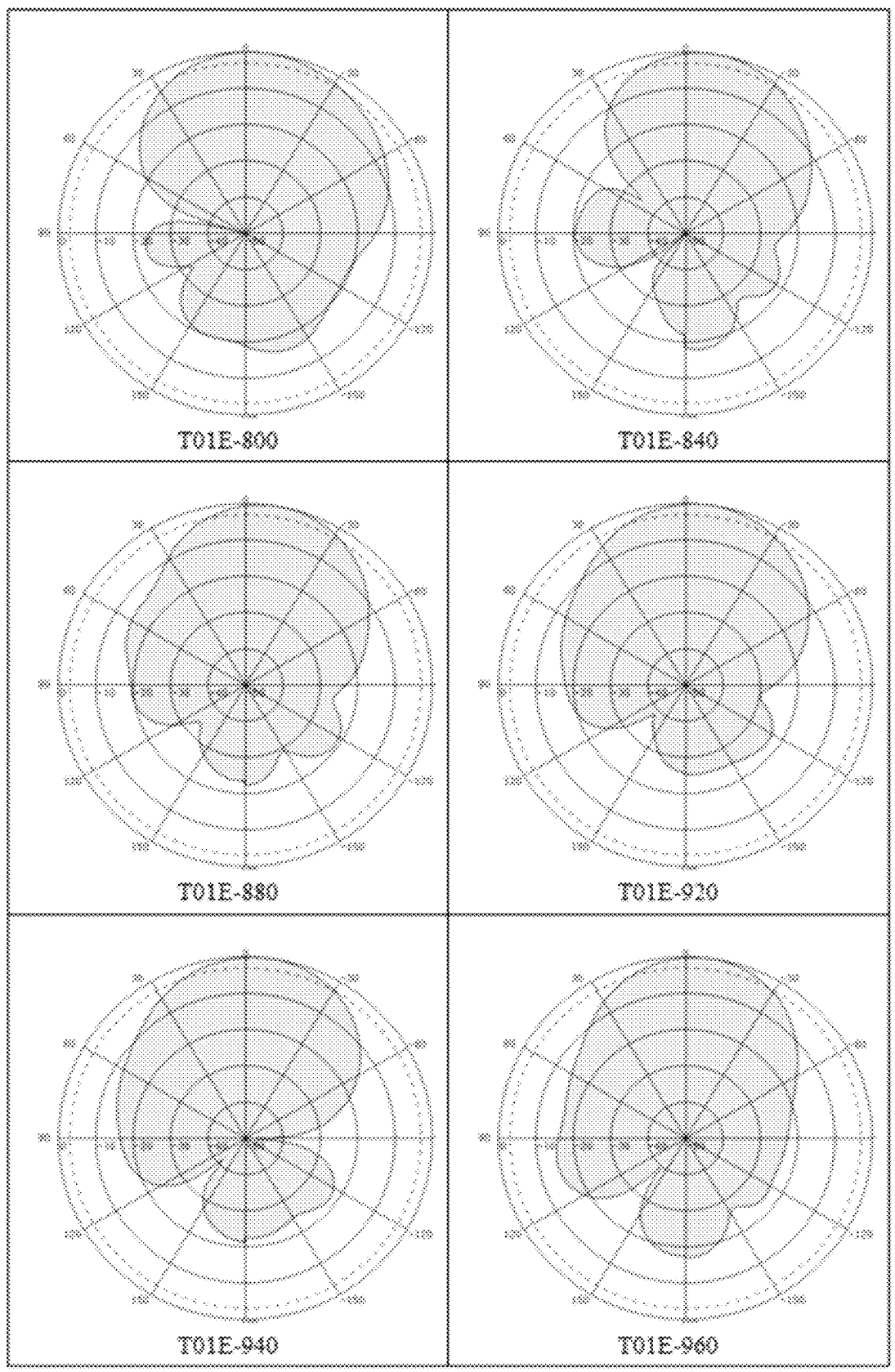
FIG. 41 is series of radiation pattern diagrams of a lower band antenna element at 800 MHz, 840 MHz, 880 MHz, 920 MHz, 940 MHz and 960 MHz.
Figure 42:
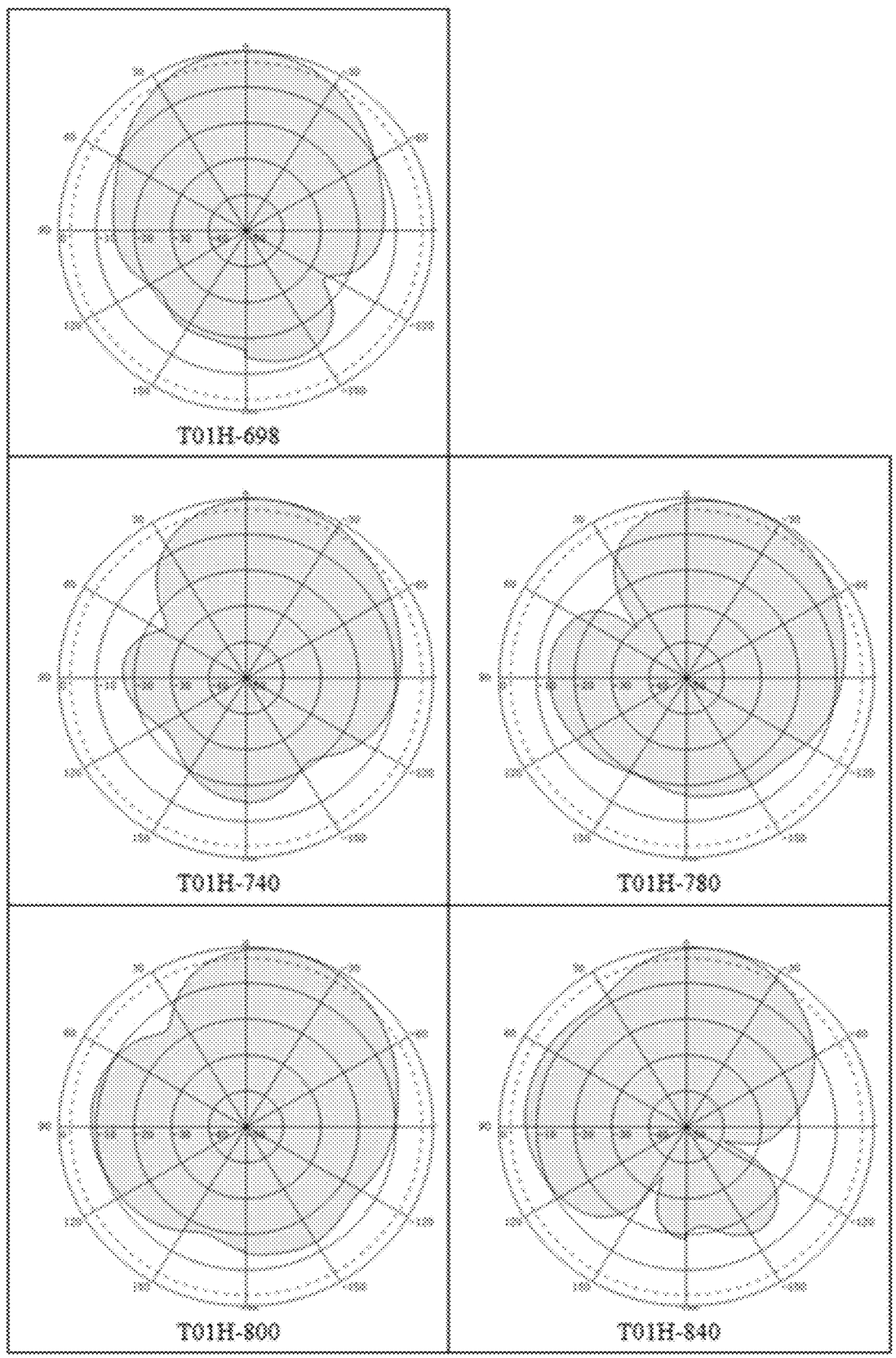
FIG. 42 is series of radiation pattern diagrams of a lower band antenna element at 698 MHz, 740 MHz, 780 MHz, 800 MHz, and 840 MHz.
Figure 43:
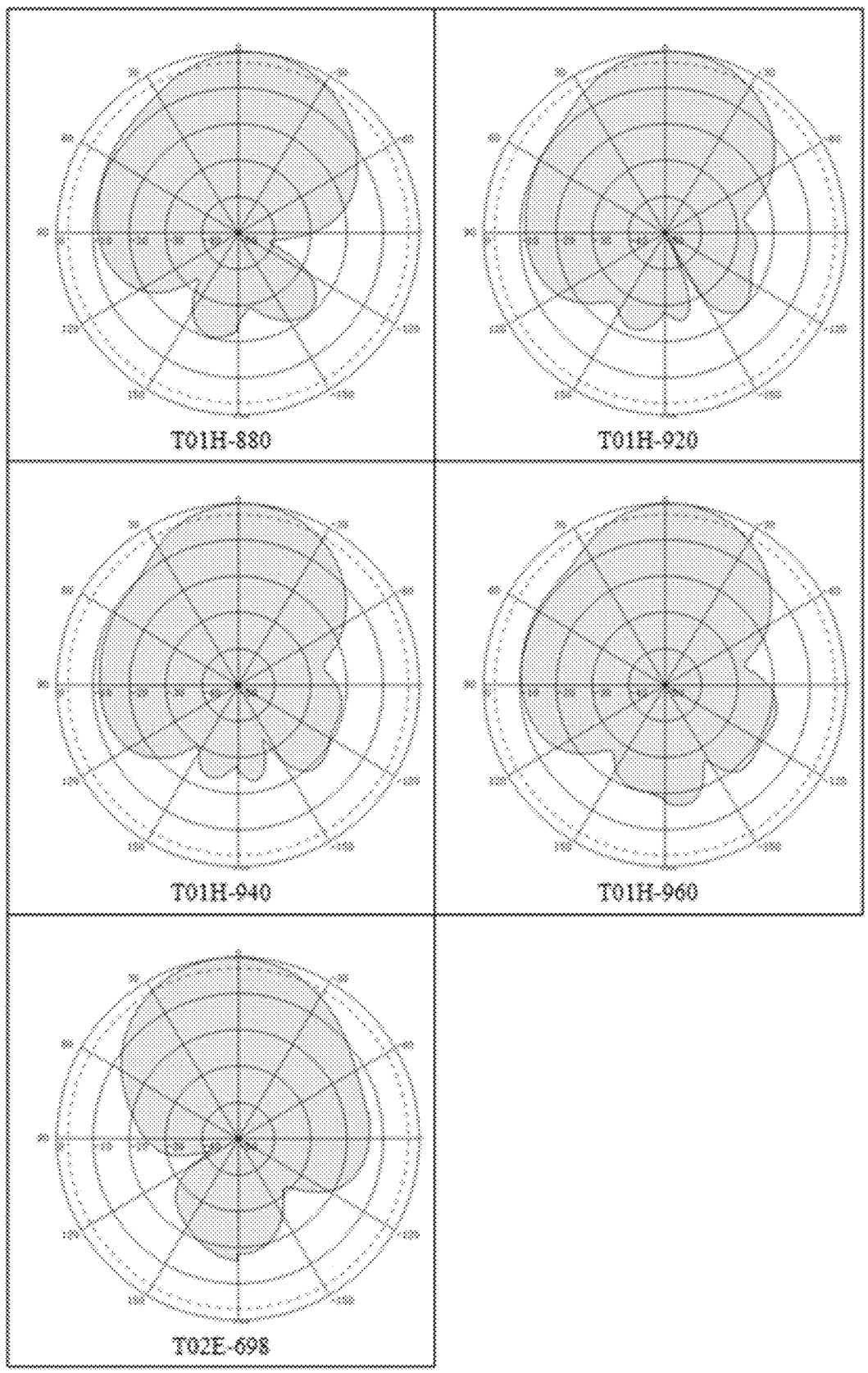
FIG. 43 is series of radiation pattern diagrams of a lower band antenna element at 880 MHz, 920 MHz, 940 MHz, 960 MHz, and 698 MHz.
Figure 44:
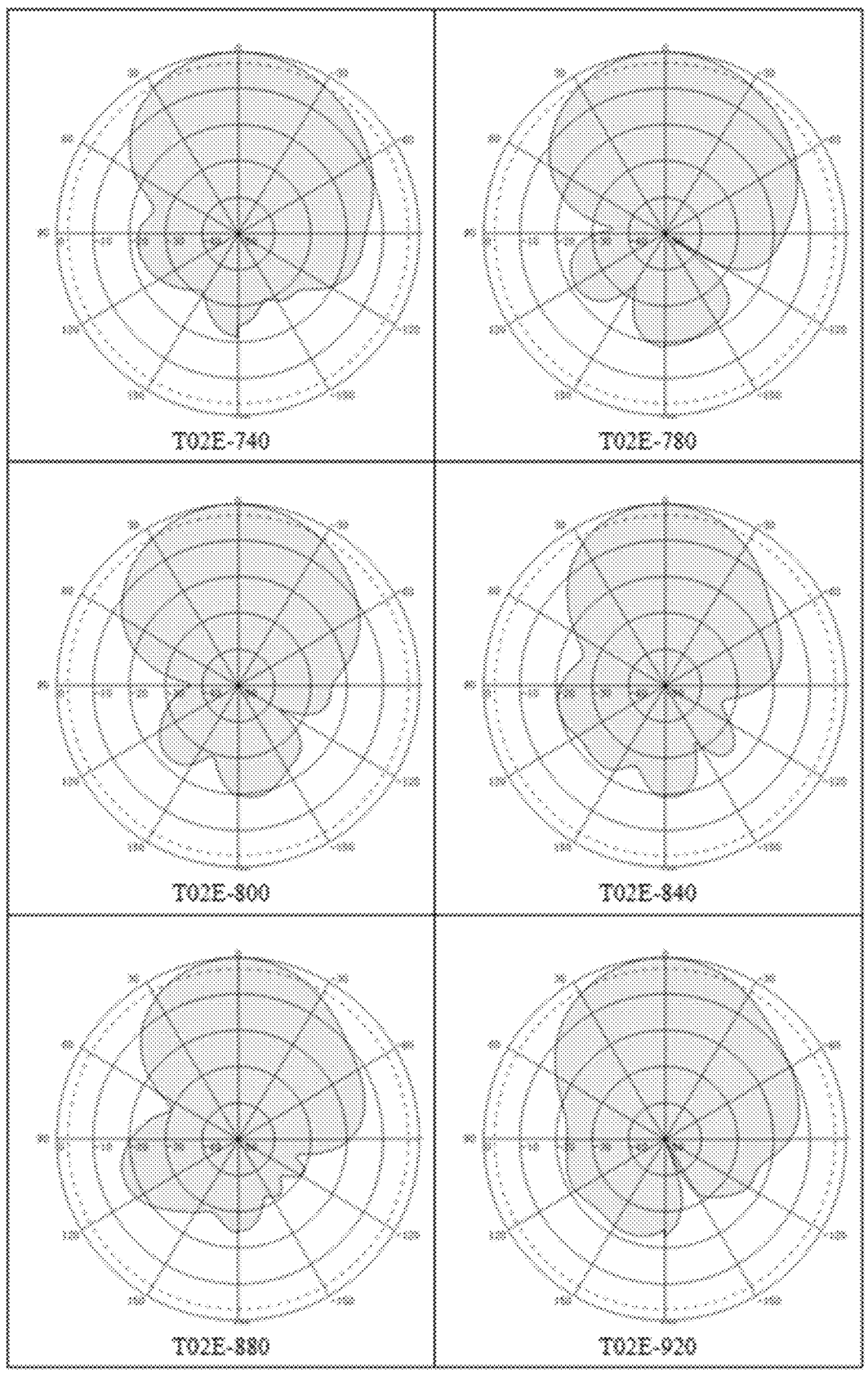
FIG. 44 is series of radiation pattern diagrams of a lower band antenna element at 740 MHz, 780 MHz, 800 MHz, 840 MHz, 880 MHz and 920 MHz.
Figure 45:
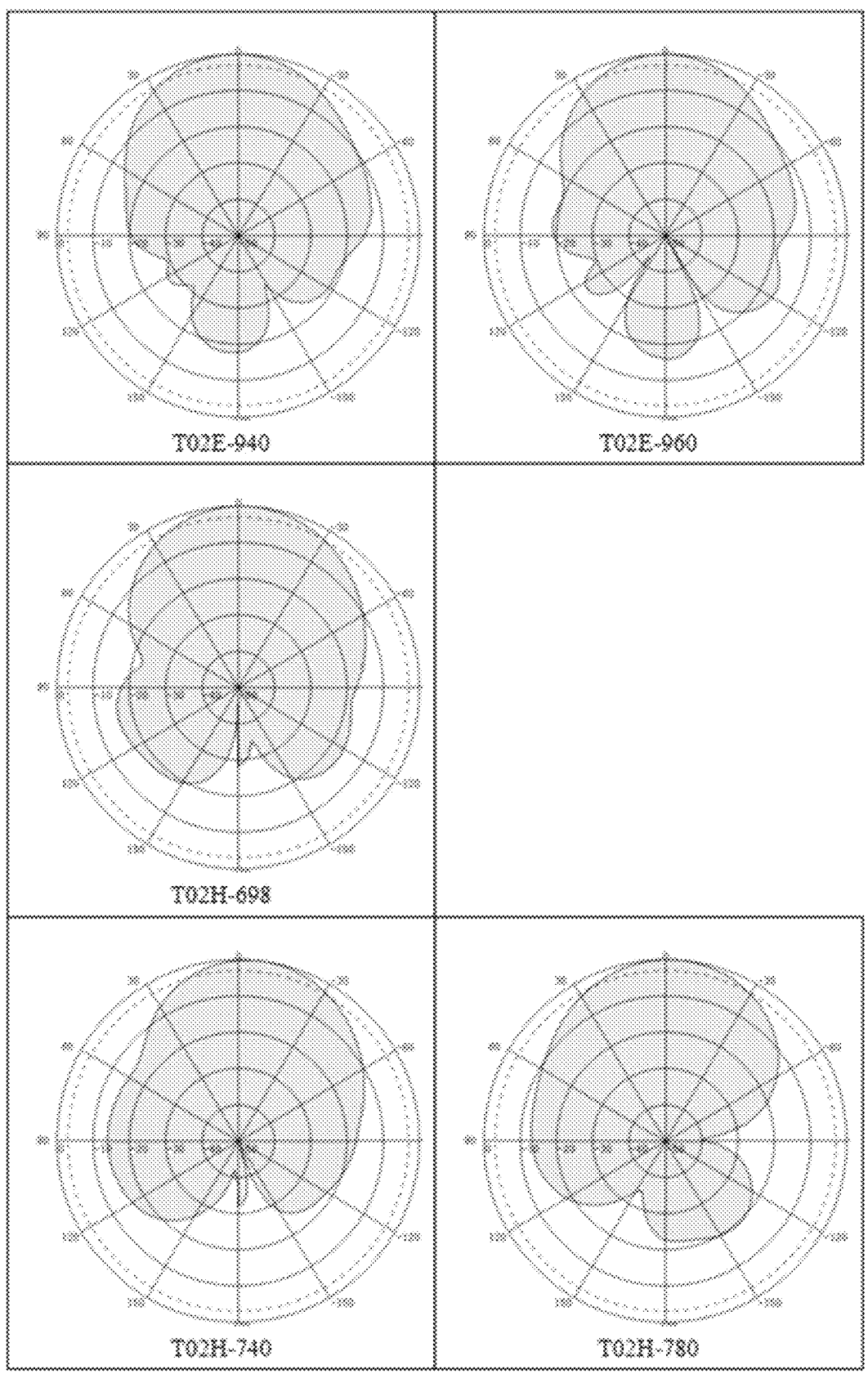
FIG. 45 is series of radiation pattern diagrams of a lower band antenna element at 940 MHz, 960 MHz, 698 MHz, 740 MHz, and 780 MHz.
Figure 46:
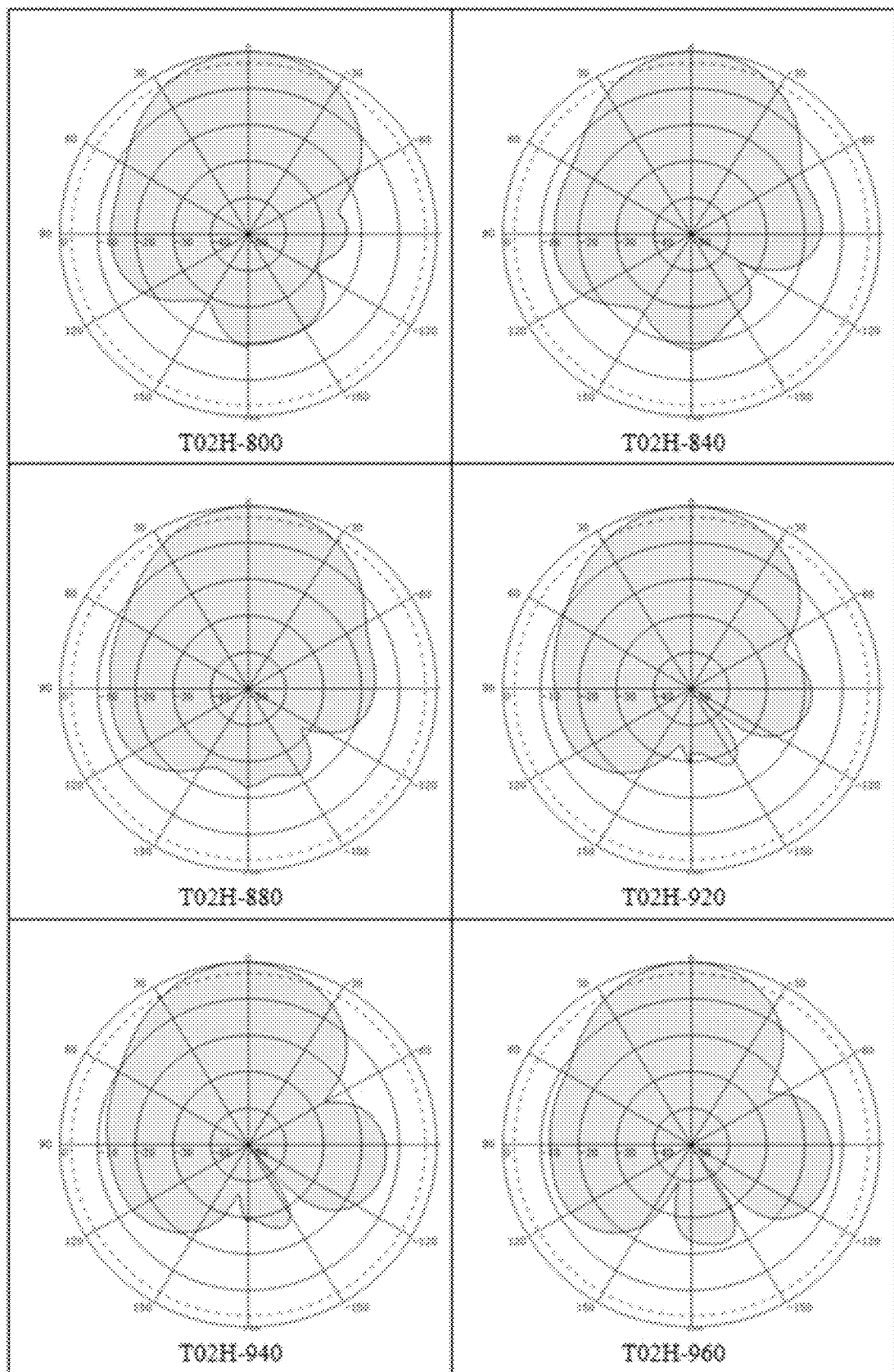
FIG. 46 is series of radiation pattern diagrams of a lower band antenna element at 800 MHz, 840 MHz, 880 MHz, 920 MHz, 940 MHz and 960 MHz.

Referring to FIGS. 19 and 24, each ultra-wideband duplexer 20A, 20B comprises a multistage band pass filter 24 and a multistage band reject filter, with multiple quarter wavelength where the ultra-wideband matching, predetermined isolation and low insertion loss are obtained.

In one embodiment, the multistage band pass filter 24 of the duplexer 20A, 20B has an ultra-wideband pass, specifically for passing the upper band frequency, while rejecting the lower band frequency. Alternatively, the multistage band pass filter 24 in multiple half-wave lengths across the upper band frequency are carefully and selectively designed in multiple shorted quarter-wave lengths when the multistage band pass filter 24 is connected onto the multistage band reject filter to become a full duplexer 20A, 20B while suppressing any unwanted self-resonance within the lower and upper frequency bands, respectively. The shorting arrangement is depicted in FIGS. 17 and 24.

The multistage band reject filter of the duplexer 20A, 20B is configured to reject the ultra-wideband, specifically for rejecting the upper band frequency, while passing the lower band frequency. Multiple quarter-wave lengths across the upper band frequency are carefully and selectively designed when the multistage band reject filter is connected onto the multistage band pass filter 24 to become a full duplexer 20A, 20B while suppressing unwanted self-resonance within the lower and upper frequency bands, respectively.

Figure 17:
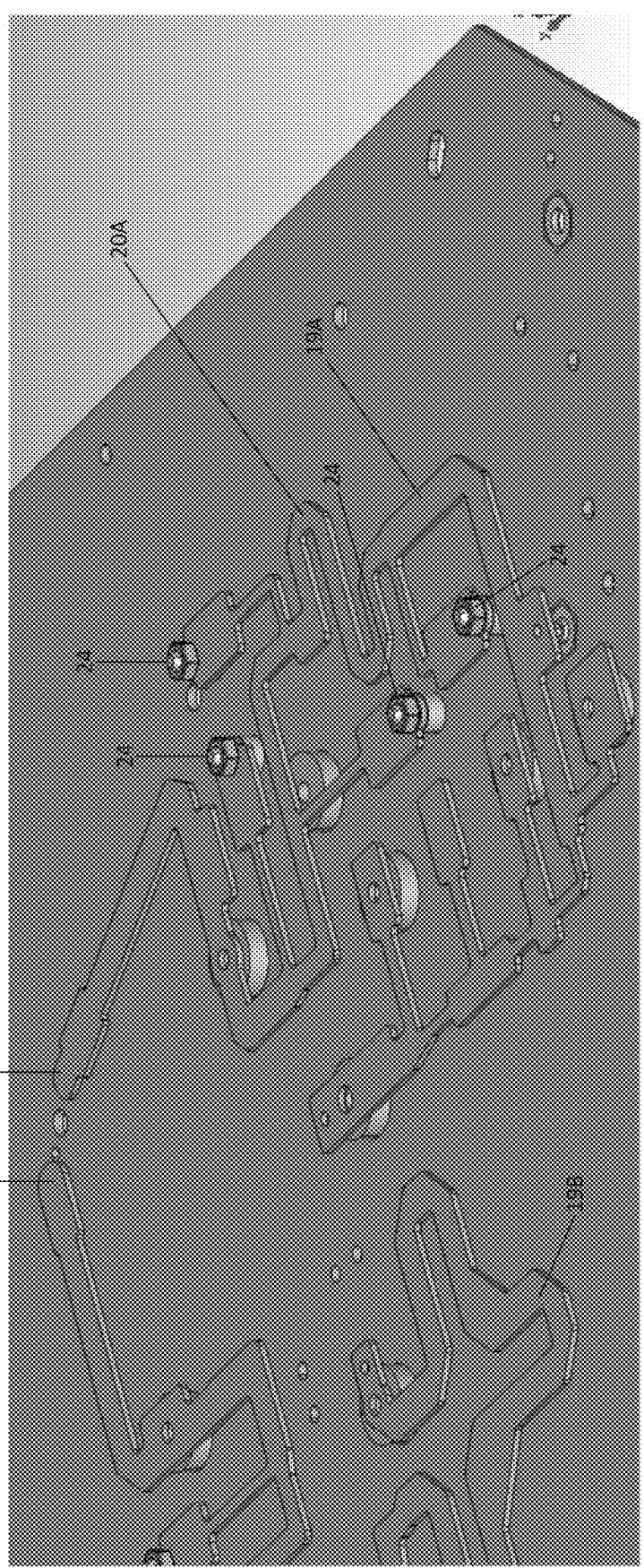
FIG. 17 is a magnified perspective view of FIG. 15 depicting a first duplexer of the duplexer set of FIG. 15.

FIGS. 17 to 19 show the detailed arrangement of two duplexers 20A, 20B design within the lower feeding network 140. The lower feeding network 140 comprises the feed matching network to the lower band antenna elements 10, 20, and the feed matching network to the upper band antenna elements 200, 210 and a pair of ultra-wideband duplexers 20A, 20B. Each duplexer 20A, 20B comprises a multistage band pass filter 24 and a multistage band reject filter where the ultra-wide-band matching, good isolation and low insertion loss is achieved.

Nested Arrangement

Figure 10:
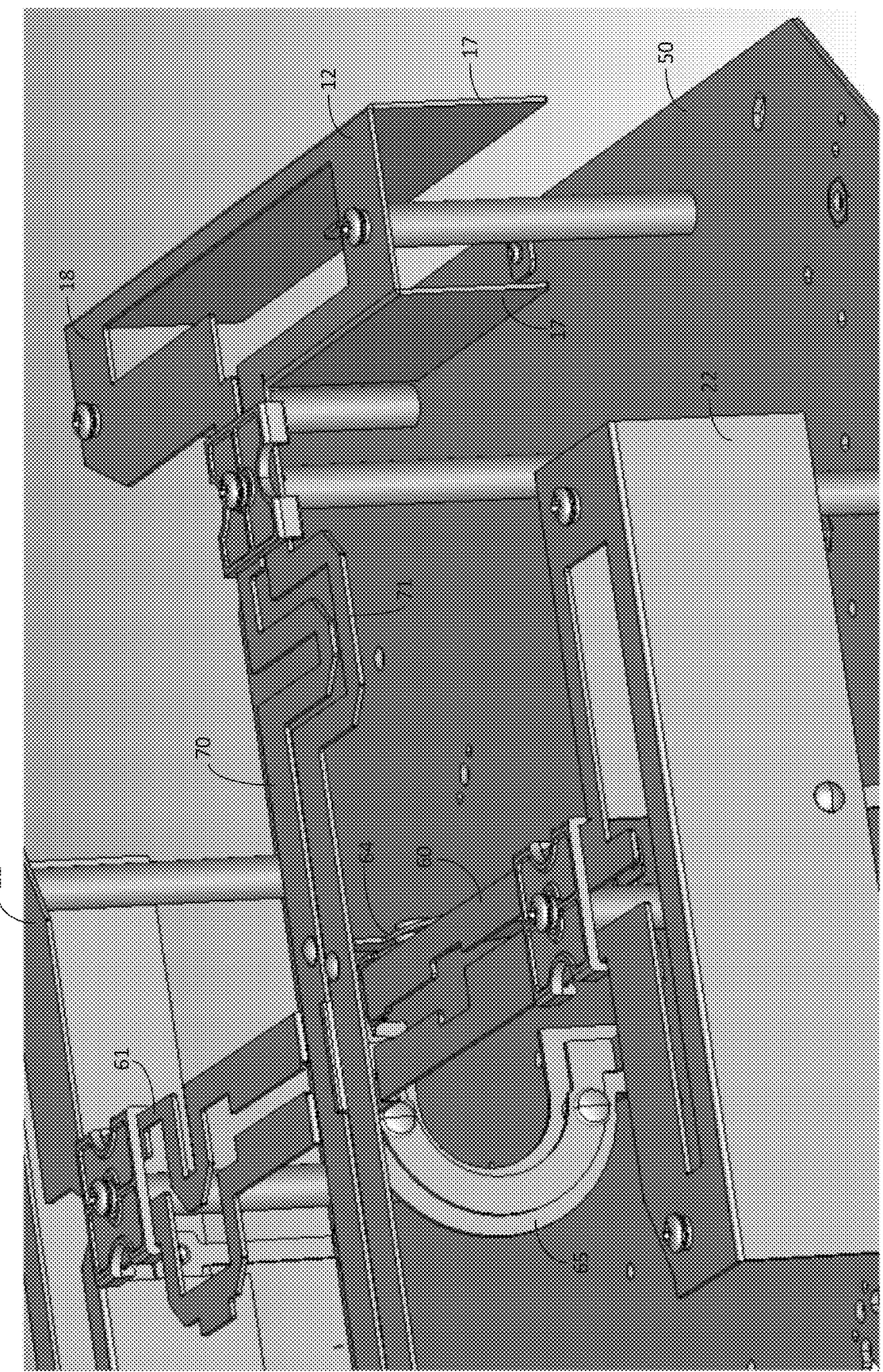
FIG. 10 is a magnified perspective view of FIG. 8 depicting the partially bent arms of a folded dipole of a lower band antenna element.
Figure 11:
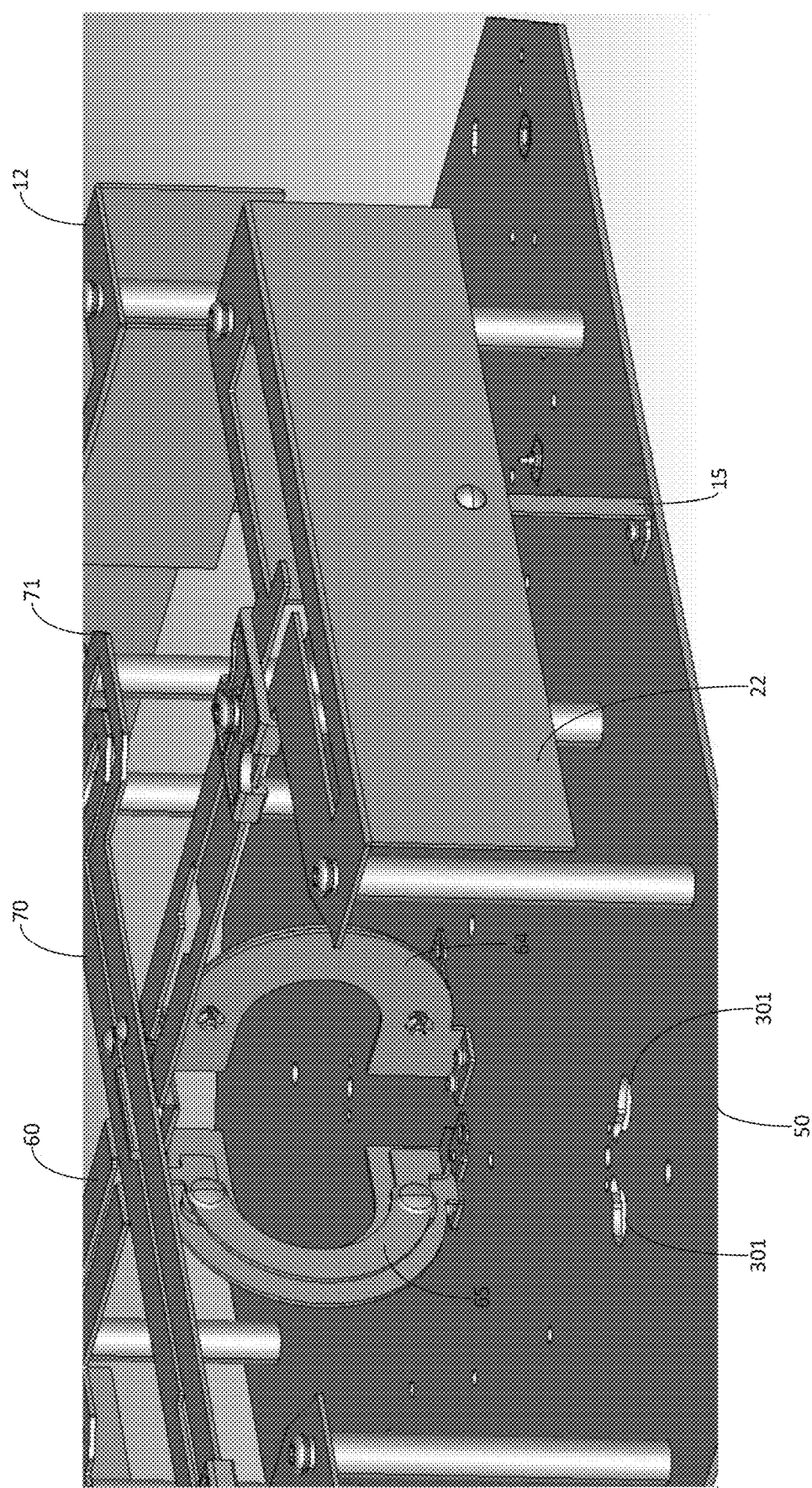
FIG. 11 is a magnified perspective view of FIG. 8 depicting a shorting pin connecting a partially bent arm of a folded dipole to the ground plane.

Referring to FIGS. 10 to 12, the present invention provides an antenna assembly 100 for multiband, for example, ultra-wideband, and a dual polarised directional antenna with a pair of upper band antenna elements 200, 210 that are nested within a pair of lower band antenna elements 10, 20. The location of the lower band antenna elements 10, 20 on each side of the ground plane 50 defines a lower band peripheral boundary, preferably proximal to or at the peripheral edge of the ground plane 50. Advantageously, substantially the entire two-dimensional area of the ground plane 50 is used. If the shape of the ground plane 50 is rectangular, the lower band peripheral boundary is similarly an imaginary rectangular border. The upper band antenna elements 200, 210 are located in the area or zone within the lower band peripheral boundary, which makes the upper band antenna elements 200, 210 nested within the lower band antenna elements 10, 20. The nested arrangement of the upper band antenna elements 200, 210 within the lower band antenna elements 10, 20 leads to the novel arrangement, location and routing paths of the associated feeding networks 130, 140 and the ultra-wideband duplexer 20A, 20B within the lower band peripheral boundary. The nested arrangement is facilitated by positioning vertically arranged microstrip lines 64, 65 configured to connect the co-planar microstrip lines 60, 70 held at an elevated height above the horizontally arranged microstrip lines 19A, 19B. By having the upper feeding network 130 positioned above the lower feeding network 140, the size of the antenna assembly 100 can remain compact.

The nesting of the nested arrangement is flexible and may enable the addition of additional antenna elements, for various operating frequency bands, such as more upper band antenna elements, Global Positioning Satellite (GPS) antenna 25, WiFi antenna 26 (see FIG. 25) and 5G antenna. By using the disclosed nested arrangement where some of the antenna parts are located on the ground plane 50 within the lower band peripheral boundary defined by the lower band antenna elements 10, 20, the same structure, arrangement and design for the antenna assembly 100 can nest more antenna elements at the same location as the first upper band antenna element 200, where there may be nested more than one antenna element with an operating frequency higher than the abovementioned upper band frequency, operating at other frequency bands to suit a specific MIMO application.

Turning to FIGS. 10 and 11, there is provided an arrangement or configuration for reducing the overall height of the antenna assembly 100 which enables the antenna assembly to have a very low profile. The arrangement of the antenna assembly 100 also improves the isolation between two orthogonal radiating polarisations with partially bent arms 13, 14, 17, 18, 23, 24, 27, 28 of the folded dipoles 11, 12, 21, 22. The height of the antenna assembly 100 is 58% of the normal height (the normal height may be 107 mm) related to the quart-wave of the lowest operating frequency of the antenna assembly 100, in one example, about 62 mm.

Turning to FIG. 12, the nesting of the two upper band antenna elements 200, 210 within the two lower band antenna elements 10, 20 provides an optimised radiation aperture as depicted in FIGS. 26 to 39 for the upper frequency band radiation performance. In a preferred embodiment, the distance is about 275 mm between two parallel folded dipoles 11, 12, 21, 22, or the two-dimensional size (length×width) of the antenna assembly 100 is configured to have optimized radiation performance at both the lower band and upper band frequencies and restricting the two-dimensional size of the antenna assembly 100 as small as possible.

Preferably, the present invention minimises the cost of manufacturing the MIMO antenna assembly 100 because the antenna parts are manufactured using metal, specifically, aluminium material, including the lower band antenna elements 10, 20, co-planar microstrip lines 60, 70, vertically arranged microstrip lines 64, 65, duplexers 20A, 20B, upper band antenna elements 200, 210, parasitic directors 80, 90 and feeding networks 130, 140. Using aluminium for material of these antenna parts enables manufacture to easier leading to cost savings. Although aluminium has been described, the present invention may be made from other materials including: RF PCB, FR4, brass, LDS (Laser Direct Structuring) or PDS (Printing Direct Structuring). The feeding networks 130, 140 can be made from a different metallic alloy.

Unless specified to the contrary, any and all components herein described are understood to be capable of being manufactured and, as such, may be manufactured together or separately.

Moreover, in interpreting the disclosure, all terms should be interpreted in the broadest reasonable manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements.

It is therefore to be understood that numerous modifications may be made to the illustrative examples and that other arrangements may be devised without departing from the spirit and scope of the technology.

What is claimed is:

1. A multiband multiple input multiple output (MIMO) dual polarised antenna assembly arranged in a nested arrangement, comprising:
   a ground plane;
   at least two dual polarised lower band antenna elements mounted to the ground plane and respectively located proximal to opposite peripheral sides of the ground plane, the location of the lower band antenna elements defining a lower band peripheral boundary;
   at least two dual polarised upper band antenna elements mounted to the ground plane and nested within the lower band peripheral boundary;
   an upper signal feeding network configured to connect opposing pairs of lower band radiating elements of the at least two dual polarised lower band antenna elements and feed the lower band antenna elements, the upper signal feeding network being located within the lower band peripheral boundary; and
   a lower feeding network positioned below the upper signal feeding network and above the ground plane, the lower feeding network comprising a pair of ultra-wideband duplexers and being configured to (i) feed the at least two dual polarised lower band antenna elements via respective vertically arranged microstrip lines that connect the upper signal feeding network and the pair of ultra-wideband duplexers, and (ii) feed a first one of the at least two dual polarised upper band antenna elements.

2. The antenna assembly according to claim 1, wherein a first upper band antenna element of the dual polarised upper band antenna elements is fed by the lower feeding network using a first ultra-wideband duplexer of the pair of ultra-wideband duplexers.

3. The antenna assembly according to claim 1, wherein the opposing pair of lower band radiating elements is a pair of orthogonal radiating units and each port of the pair of orthogonal radiating units has two folded dipoles, in parallel configuration.

4. The antenna assembly according to claim 3, wherein the folded dipoles each have partially bent arms that are bent towards the ground plane in order to provide a predetermined isolation between two orthogonal radiating units and reduce a profile of the antenna assembly.

5. The antenna assembly according to claim 4, further comprising four shorting pins connecting the partially bent arms with the ground plane.

6. The antenna assembly according to claim 1, wherein the upper signal feeding network comprises co-planar microstrip lines to connect each pair of orthogonal radiating units and provide a balanced feed for the lower band antenna elements.

7. The antenna assembly according to claim 6, wherein the co-planar microstrip lines are fed by the vertically arranged microstrip lines connected to the lower feeding network.

8. The antenna assembly according to claim 1, wherein the at least two dual polarised upper band antenna elements are identical, each upper band antenna element of the at least two dual polarised upper band antenna elements comprising a pair of ultra-wideband dipoles, an ultra-wideband balun and a parasitic director.

9. The antenna assembly according to claim 8, wherein the ultra-wideband balun is configured for ultra-wideband matching and to provide balance feeding of the at least two dual polarised upper band antenna elements.

10. The antenna assembly according to claim 7, wherein the pair of ultra-wideband duplexers are configured to combine or split the upper signal feeding network, through the vertically arranged microstrip lines, to the lower band antenna elements and a first one of the at least two dual polarised upper band antenna elements, each ultra-wideband duplexer comprising a multistage band pass filter and a multistage band-reject filter to provide ultra wide-band matching, predetermined isolation and low insertion loss.

11. The antenna assembly according to claim 10, wherein the multistage band pass filter in multiple half-wave lengths across an ultra-wideband frequency is predetermined in multiple shorted quarter-wave lengths when the multistage band pass filter is connected to the multistage band reject filter to form a full duplexer configured to suppress unwanted self-resonance within the lower and upper frequency bands, respectively.

12. The antenna assembly according to claim 1, wherein a second one of the at least two dual polarised upper band antenna elements provides ultra-wideband performance in dual polarisation at an upper band frequency.

13. The antenna assembly according to claim 1, wherein the lower and upper band antenna elements, and the lower and upper feeding networks are made from aluminium.

14. The antenna assembly according to claim 1, wherein a height of the antenna assembly is about 62 mm.

* * * * *